US011363497B2

(12) United States Patent
Jeon et al.

(10) Patent No.: US 11,363,497 B2
(45) Date of Patent: Jun. 14, 2022

(54) MULTI-PATH END-TO-END CONNECTIVITY FOR CELLULAR MESH NETWORKS

(71) Applicant: Samsung Electronics Co., Ltd., Suwon-si (KR)

(72) Inventors: Jeongho Jeon, San Jose, CA (US); Vishnu Vardhan Ratnam, Plano, TX (US); Joonyoung Cho, Portland, OR (US)

(73) Assignee: Samsung Electronics Co., Ltd., Suwon-si (KR)

( * ) Notice: Subject to any disclaimer, the term of this patent is extended or adjusted under 35 U.S.C. 154(b) by 219 days.

(21) Appl. No.: 16/732,208

(22) Filed: Dec. 31, 2019

(65) Prior Publication Data
US 2020/0221344 A1 Jul. 9, 2020

Related U.S. Application Data

(60) Provisional application No. 62/787,825, filed on Jan. 3, 2019, provisional application No. 62/787,830, filed on Jan. 3, 2019.

(51) Int. Cl.
*H04W 28/10* (2009.01)
*H04L 45/24* (2022.01)
(Continued)

(52) U.S. Cl.
CPC .............. *H04W 28/10* (2013.01); *H04L 45/24* (2013.01); *H04W 28/0278* (2013.01);
(Continued)

(58) Field of Classification Search
CPC .. H04L 45/24; H04L 47/122; H04W 28/0278; H04W 28/0284; H04W 28/0289;
(Continued)

(56) References Cited

U.S. PATENT DOCUMENTS 8,520,578 B2 8/2013 Rayment et al.
2006/0083186 A1 4/2006 Handforth et al.
(Continued)

FOREIGN PATENT DOCUMENTS

EP 2552065 B1 4/2018

OTHER PUBLICATIONS

Notification of Transmittal of the International Search Report and the Written Opinion of the International Searching Authority, or the Declaration dated Apr. 13, 2020 in connection with International Patent Application No. PCT/KR2020/000120, 10 pages.

*Primary Examiner* — Khoa Huynh

(57) ABSTRACT

Methods and apparatuses for multi-path end-to-end connectivity in a wireless communication system. A BS apparatus includes a processor configured to identify congestion in the wireless communication network experienced by the BS. The processor is further configured to generate congestion feedback information indicating the congestion in the wireless communication network. The BS also includes a transceiver operably connected to the processor. The transceiver is configured to transmit the congestion feedback information to at least one other BS in the wireless communication network. The processor is configured to identify multiple of the paths that respective portions of the data are split between to be transferred between a gateway and a UE. The multiple paths are determined based at least in part on the congestion feedback information. The transceiver is configured to transfer, via the wireless communication network based on the identified multiple paths, data between the UE and the gateway.

16 Claims, 20 Drawing Sheets

(51) Int. Cl.
   *H04W 28/02*   (2009.01)
   *H04W 28/16*   (2009.01)
   *H04W 72/10*   (2009.01)
   *H04W 72/08*   (2009.01)
   *H04W 88/02*   (2009.01)
   *H04W 88/16*   (2009.01)

(52) U.S. Cl.
   CPC ....... *H04W 28/0284* (2013.01); *H04W 28/16* (2013.01); *H04W 72/08* (2013.01); *H04W 72/10* (2013.01); *H04W 88/02* (2013.01); *H04W 88/16* (2013.01)

(58) Field of Classification Search
   CPC . H04W 28/10; H04W 28/16; H04W 72/0426; H04W 72/08; H04W 72/085; H04W 72/10; H04W 88/02; H04W 88/08; H04W 88/16
   See application file for complete search history.

(56) References Cited

U.S. PATENT DOCUMENTS

| | | |
|---|---|---|
| 2011/0170526 A1 | 7/2011 | Hsieh et al. |
| 2016/0057687 A1* | 2/2016 | Horn ............. H04W 28/10 370/331 |
| 2016/0308755 A1* | 10/2016 | Garg ............. H04L 47/122 |
| 2018/0167994 A1 | 6/2018 | Fujishiro et al. |
| 2018/0332639 A1 | 11/2018 | Futaki |
| 2021/0168645 A1* | 6/2021 | Adjakple ......... H04W 28/0278 |

* cited by examiner

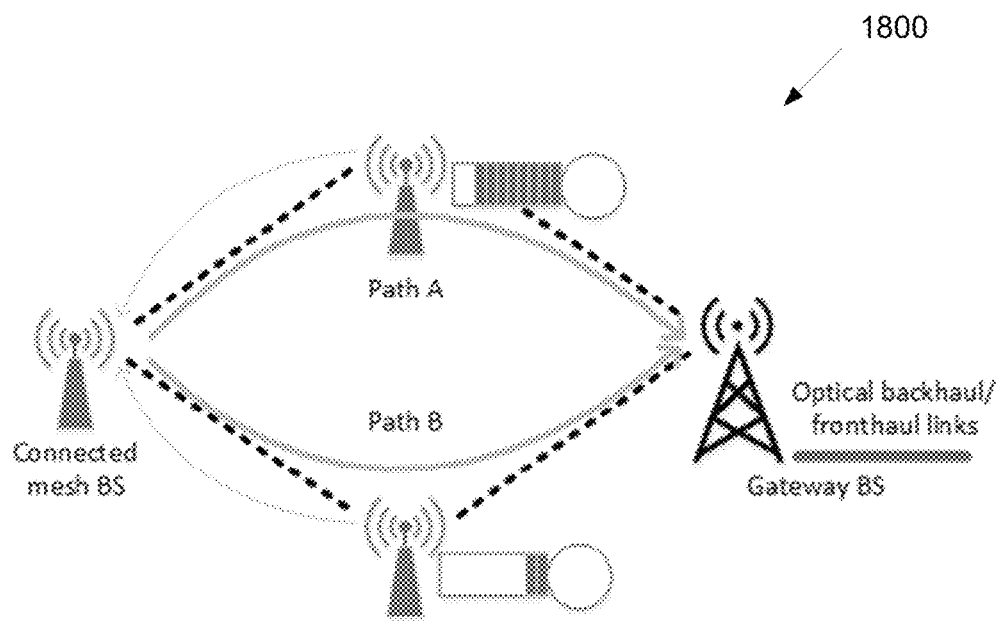
FIG. 18
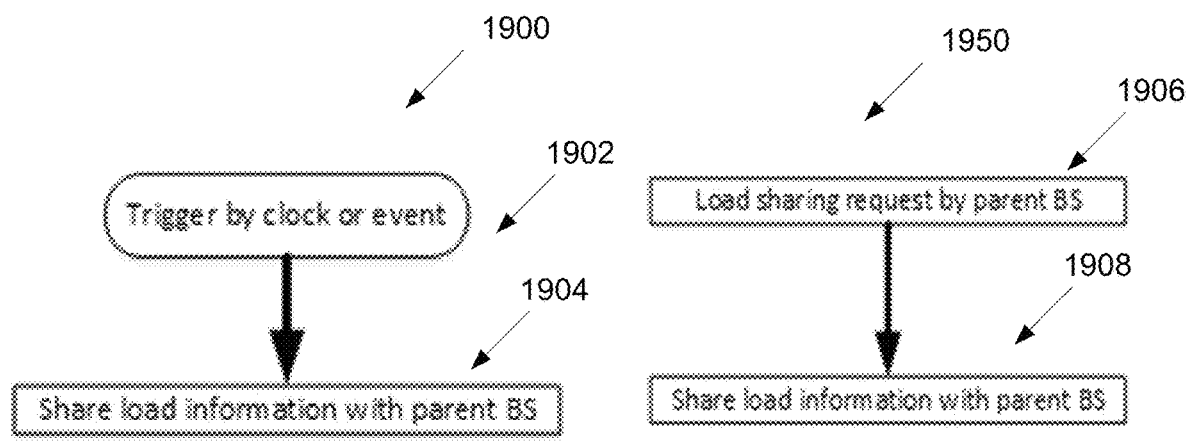
FIG. 19A
FIG. 19B

MULTI-PATH END-TO-END CONNECTIVITY FOR CELLULAR MESH NETWORKS

CROSS-REFERENCE TO RELATED APPLICATIONS AND CLAIM OF PRIORITY

The present application claims priority to U.S. Provisional Patent Application No. 62/787,825, filed on Jan. 3, 2019 and U.S. Provisional Patent Application No. 62/787,830, filed on Jan. 3, 2019. The content of the above-identified patent documents is incorporated herein by reference.

TECHNICAL FIELD

The present application relates generally to an advanced wireless communication system with multi-hop links, more specifically, the present disclosure relates to multi-path end-to-end connectivity in an advanced wireless communication system.

BACKGROUND

A communication system includes a downlink (DL) that conveys signals from transmission points such as base stations (BSs) to reception points such as user equipments (UEs) and an uplink (UL) that conveys signals from transmission points such as UEs to reception points such as BSs. Increasing the deployment density of BSs is a way to increase data throughputs, via spatial reuse of frequencies. In fact, such spatial reuse has been one of the main contributors for increase in system throughput since the early days of cellular communication. While improving spatial reuse, a dense BS deployment may be inevitable at millimeter wave (mm-wave) and terahertz (THz) frequencies to improve coverage, by compensating for the pathloss and blockage. However, the deployment locations and density of conventional BSs is limited by the availability of expensive fiber backhaul.

SUMMARY

The present disclosure relates to multi-path end-to-end connectivity for cellular mesh networks in an advanced wireless communication system.

In one embodiment, a BS in a wireless communication network is provided. The BS includes a processor configured to identify congestion in the wireless communication network experienced by the BS. The wireless communication network includes a plurality of BSs, of which the BS is one, that provide a plurality of paths for transfer of data between a gateway and a UE. The processor is further configured to generate congestion feedback information indicating the congestion in the wireless communication network. The BS also includes a transceiver operably connected to the processor. The transceiver is configured to transmit the congestion feedback information to at least one other BS in the wireless communication network. The processor is configured to identify multiple of the paths that respective portions of the data are split between to be transferred between the gateway and the UE. The multiple paths are determined based at least in part on the congestion feedback information. The determination of the multiple paths that the respective portions of the data are split between is made by the BS or indicated to the BS by the gateway. The transceiver is configured to transfer, via the wireless communication network based on the identified multiple paths, data between the UE and the gateway.

In another embodiment, a method for operating a BS in a wireless communication network is provided. The method includes identifying congestion in the wireless communication network experienced by the BS. The wireless communication network includes a plurality of BSs, of which the BS is one, that provide a plurality of paths for transfer of data between a gateway and a UE. The method includes generating congestion feedback information indicating the congestion in the wireless communication network, transmitting the congestion feedback information to at least one other BS in the wireless communication network, and identifying multiple of the paths that respective portions of the data are split between to be transferred between the gateway and the UE. The multiple paths are determined based at least in part on the congestion feedback information. The determination of the multiple paths that the respective portions of the data are split between is made by the BS or indicated to the BS by the gateway. The method further includes transferring, via the wireless communication network based on the identified multiple paths, data between the UE and the gateway.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 18 illustrates an example of load aware dynamic traffic steering according to embodiments of the present disclosure;

FIG. 19A illustrates a flowchart of a method for load information sharing with parent BS to enable traffic splitting according to embodiments of the present disclosure;

FIG. 19B illustrates another flowchart of a method for load information sharing with parent BS to enable traffic splitting according to embodiments of the present disclosure;

DETAILED DESCRIPTION

FIG. 1 through FIG. 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
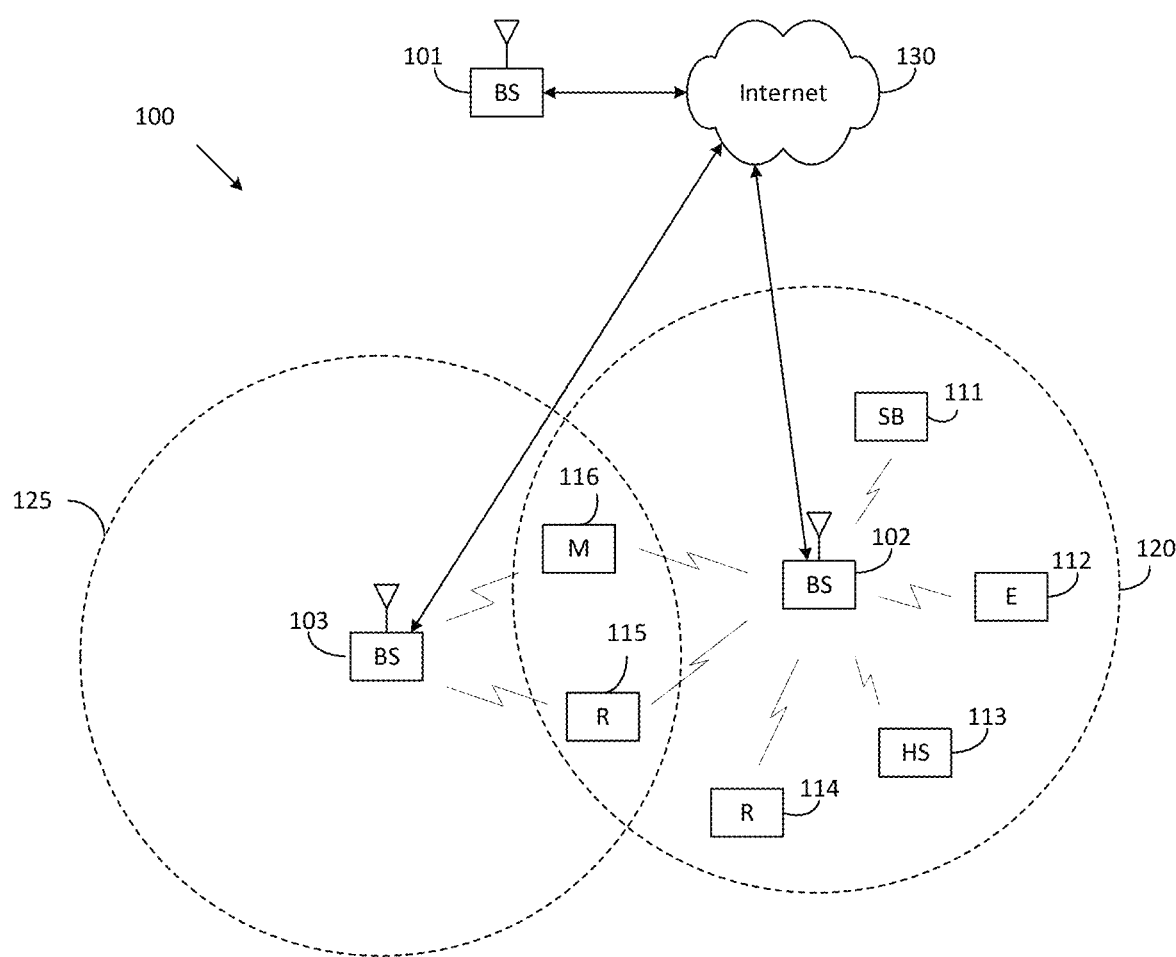
FIG. 1 illustrates an example wireless network according to embodiments of the present disclosure.
Figure 2:
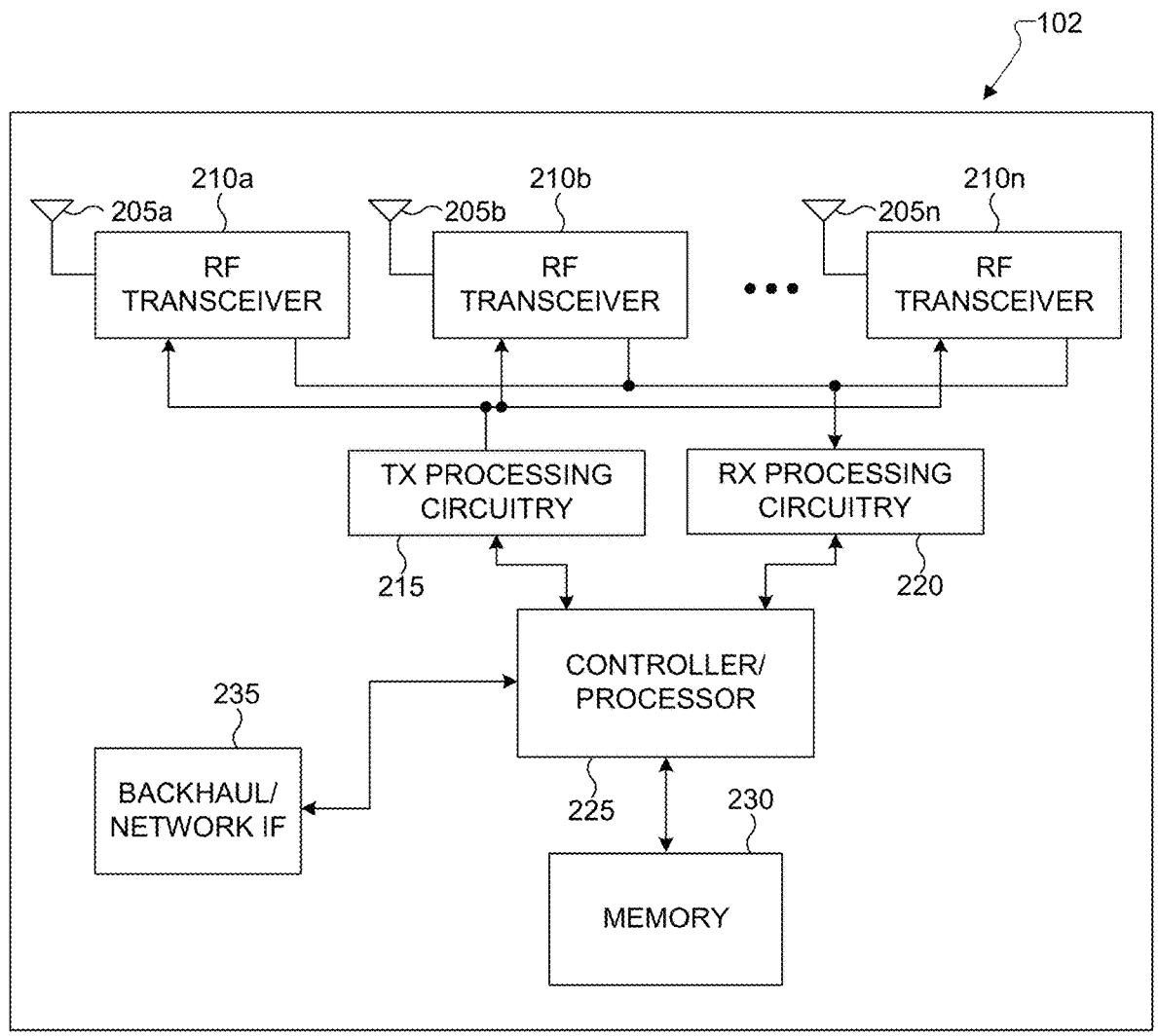
FIG. 2 illustrates an example gNB according to embodiments of the present disclosure.
Figure 3:
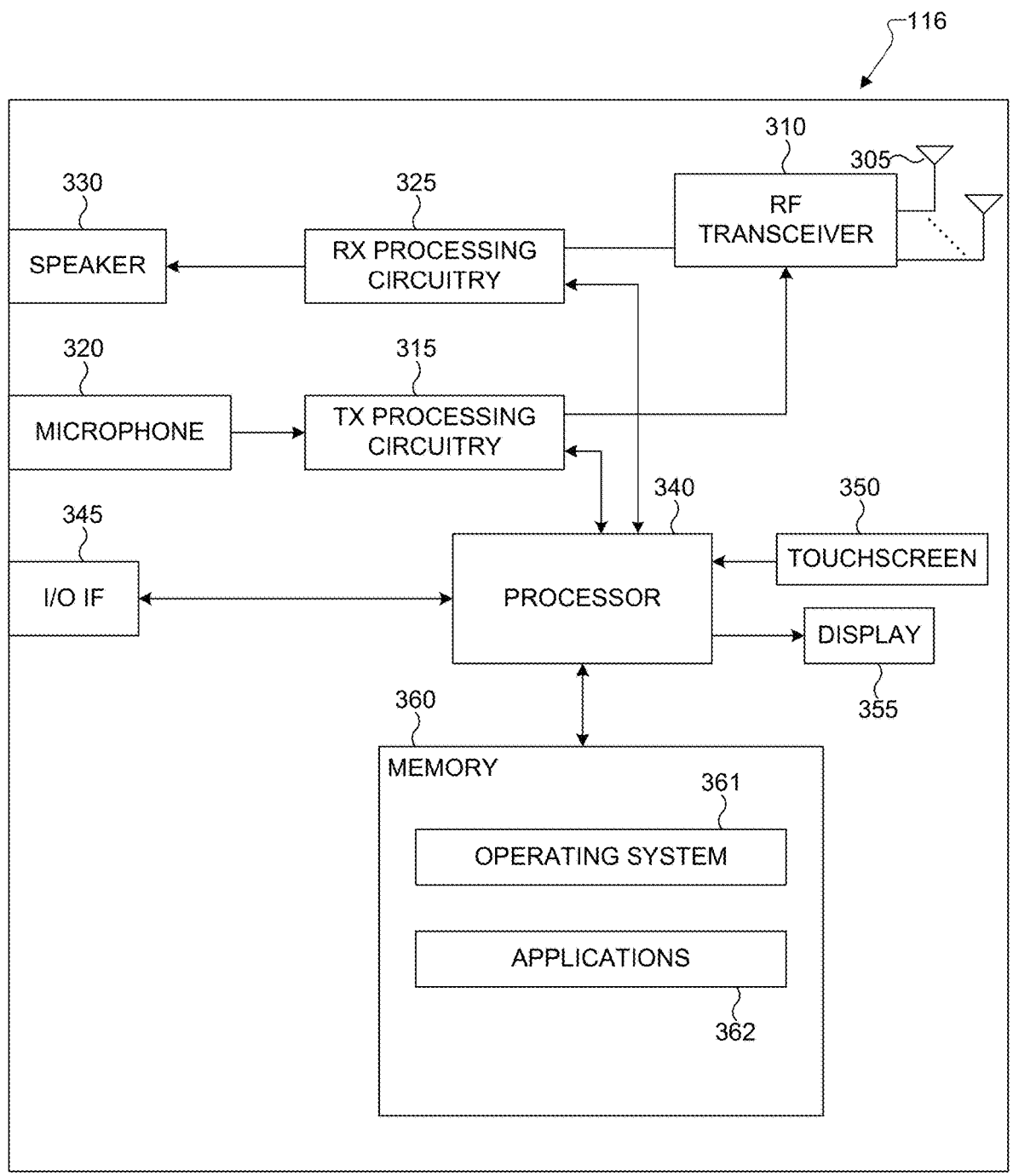
FIG. 3 illustrates an example UE according to embodiments of the present disclosure.

FIGS. 1-3 below describe various embodiments implemented in wireless communications systems and with the use of orthogonal frequency division multiplexing (OFDMA) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for reception reliability for data and control information in an advanced wireless communication system. In certain embodiments, and one or more of the gNBs 101-103 includes circuitry, programming, or a combination thereof, for efficient multi-path end-to-end connectivity for cellular mesh network.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a UE communicating with a base station and to transmissions to and receptions from a UE of physical DL control channels (PDCCHs) for operation with dual connectivity. A communication system includes a DL that refers to transmissions from a base station or one or more transmission points to UEs and an UL that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
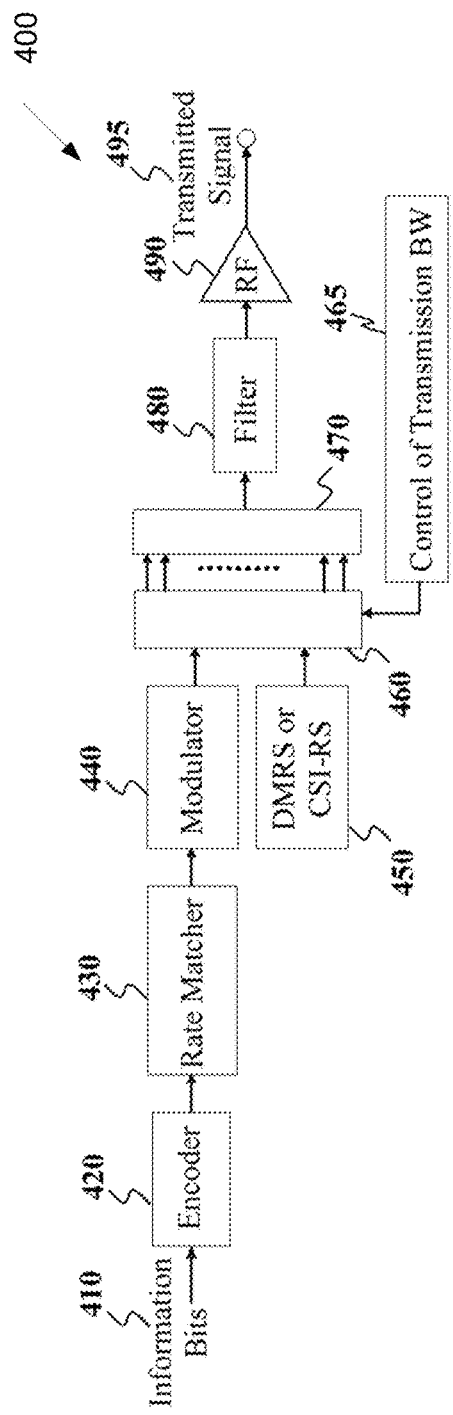
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping circuit 465, an inverse fast Fourier transform (IFFT) is performed by filter 470, a cyclic prefix (CP) is added by CP insertion circuit 480, and a resulting signal is filtered by filter 490 and transmitted by an radio frequency (RF) circuit 495.

Figure 5:
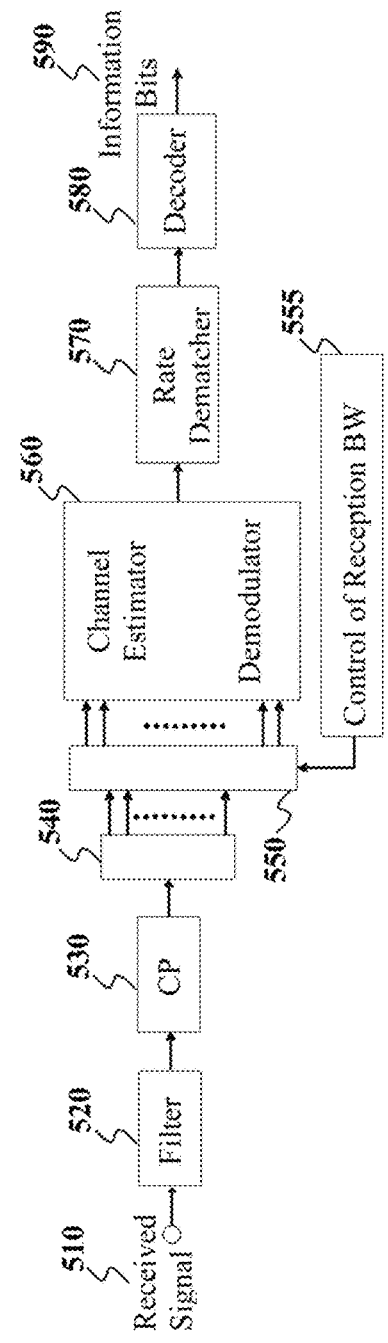
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal circuit removes a CP 530, a filter 540 applies a fast Fourier transform (FFT), SCs de-mapping circuit 550 de-maps SCs selected by BW selector circuit 555, received symbols are demodulated by a channel estimator and a demodulator circuit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher-layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
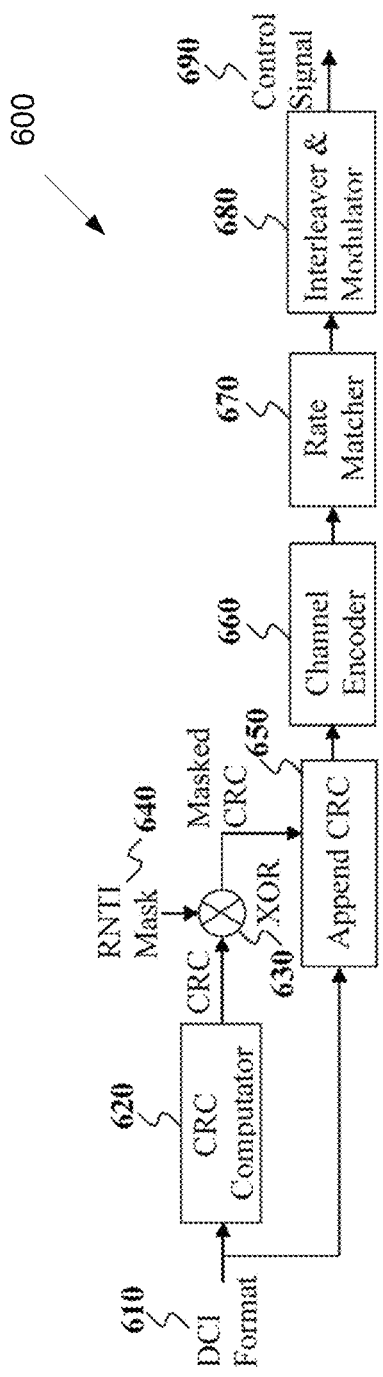
FIG. 6 illustrates an example encoding process for a DCI format according to embodiments of the present disclosure.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented by specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation circuit 620, and the CRC is masked using an exclusive OR (XOR) operation circuit 630 between CRC bits and RNTI bits 640. The XOR operation is defined as XOR (0,0)=0, XOR (0,1)=1, XOR (1,0)=1, XOR (1,1)=0. The masked CRC bits are appended to DCI format information bits using a CRC append circuit 650. An encoder 660 performs channel coding (such as tail-biting convolutional coding or polar coding), followed by rate matching to allocated resources by rate matcher 670. Interleaving and modulation circuits 680 apply interleaving and modulation, such as QPSK, and the output control signal 690 is transmitted.

Figure 7:
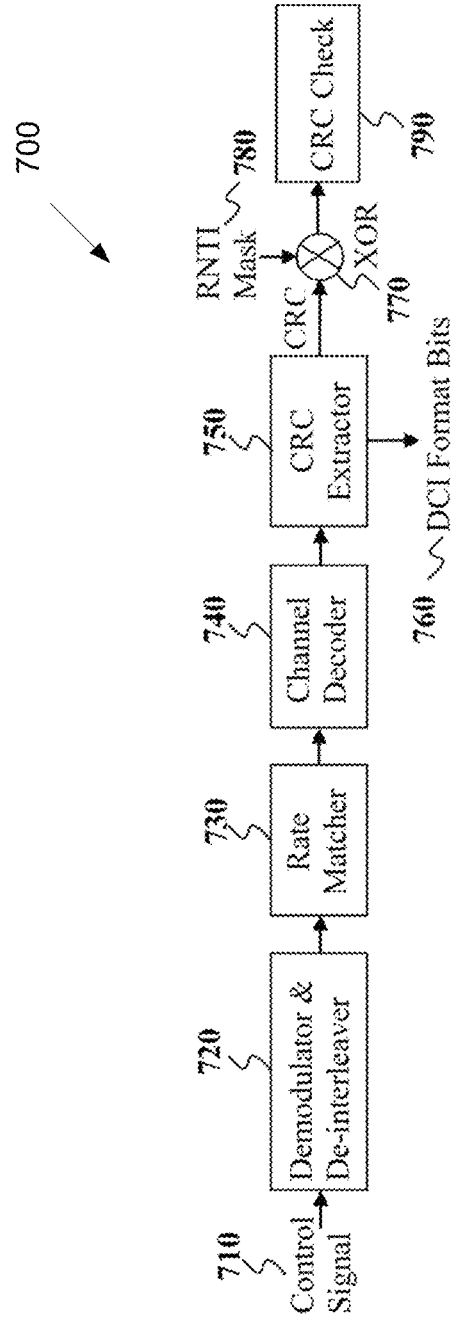
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by circuit 790. When the CRC check succeeds (check-sum is zero), the DCI format information bits are considered to be valid. When the CRC check does not succeed, the DCI format information bits are considered to be invalid.

Increasing the deployment density of BSs is a way to increase data throughputs, via spatial reuse of frequencies. In fact, such spatial reuse has been one of the main contributors for increase in system throughput since the early days of cellular communication. While improving spatial reuse, a dense BS deployment may be inevitable at millimeter wave (mm-wave) and terahertz (THz) frequencies to improve coverage, by compensating for the pathloss and blockage.

However, the deployment locations and density of conventional BSs is limited by the availability of expensive fiber backhaul.

Figure 8:
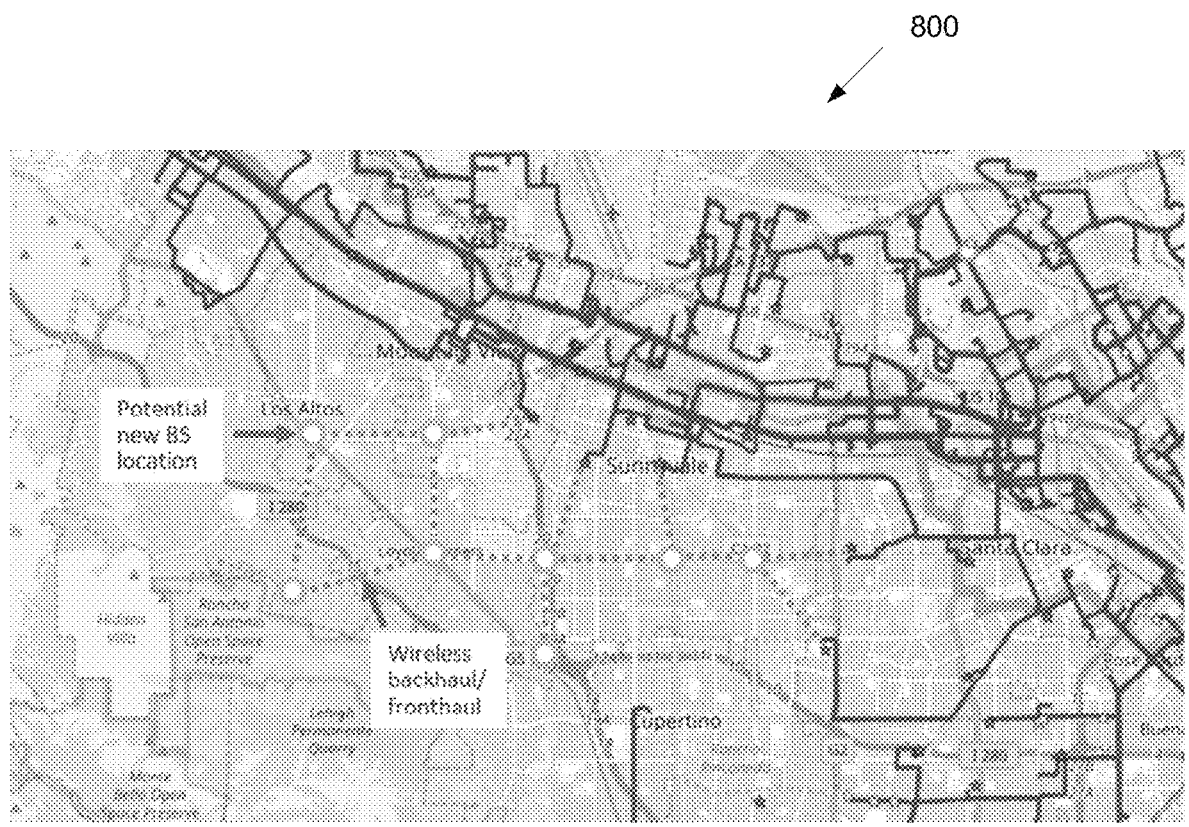
FIG. 8 illustrates an example of fiber and BS deployment in which embodiments of the present disclosure may be applied.

FIG. 8 illustrates an example fiber and BS deployment 800 according to embodiments of the present disclosure. The embodiment of the fiber and BS deployment 800 illustrated in FIG. 8 is for illustration only. FIG. 8 does not limit the scope of the present disclosure to any particular implementation.

As an illustration, FIG. 8 shows a typical fiber and BS deployment in an urban area. An effective way to "unleash" the BS deployment from fiber and provide improved coverage and better deployment density without additional expensive fiber deployment, is by using wireless backhaul for the BSs. To be most effective, such BSs may be capable of establishing one or more backhaul paths to the fiber network, with each path encompassing one or more wireless links as illustrated in FIG. 8 i.e., multi-connectivity and multi-hop functionality can be supported. A deployed network with such capabilities is referred to as a wireless mesh network.

Figure 9:
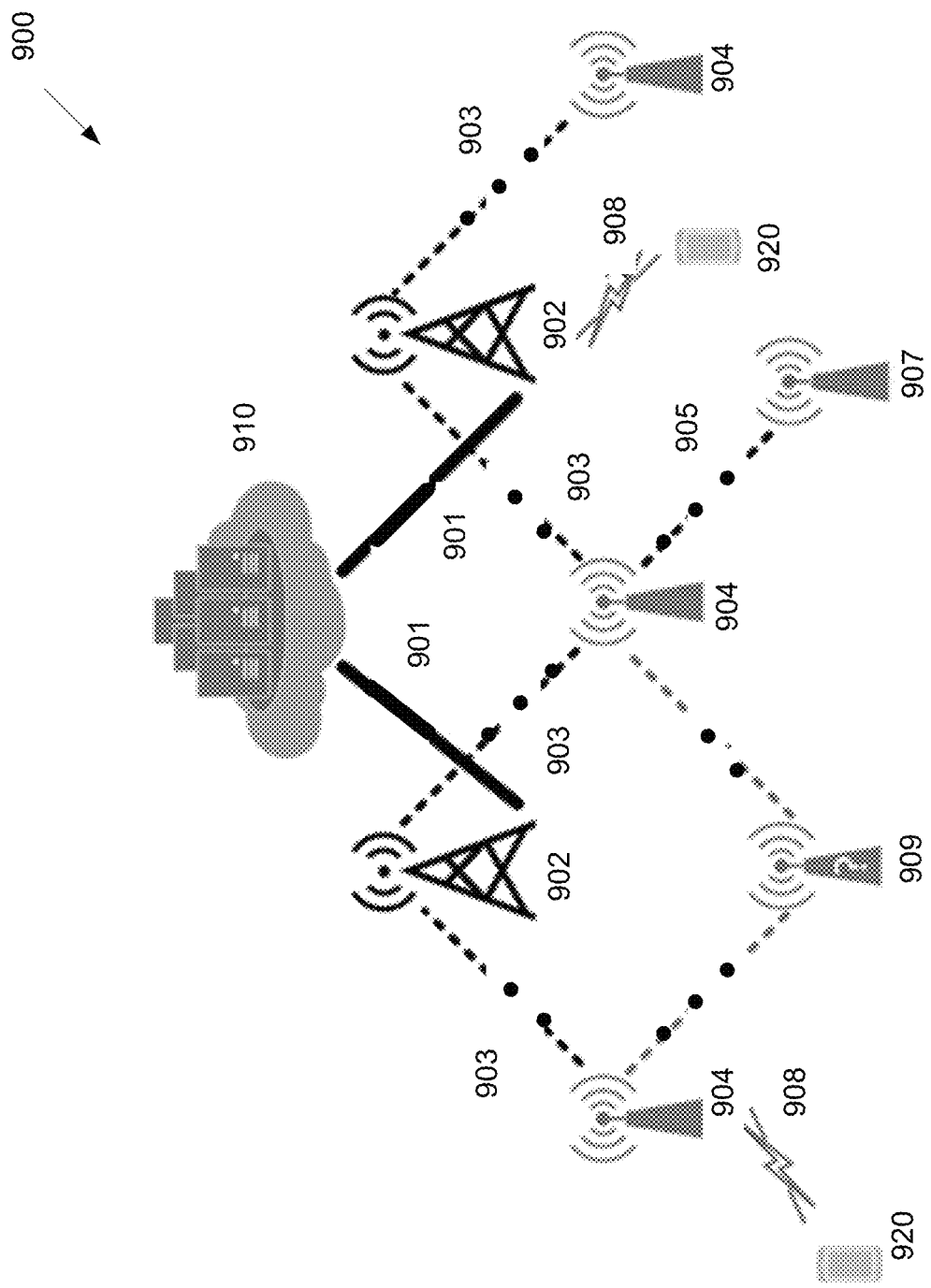
FIG. 9 illustrates an example multi-hop wireless backhaul mesh network according to embodiments of the present disclosure.

FIG. 9 illustrates an example multi-hop wireless backhaul mesh network 900 according to embodiments of the present disclosure. For example, the network 900 is an example of one embodiment of the network 100 in FIG. 1. The embodiment of the multi-hop wireless backhaul mesh network 900 illustrated in FIG. 9 is for illustration only. FIG. 9 does not limit the scope of the present disclosure to any particular implementation.

An illustrative example of a multi-hop wireless mesh network is provided in FIG. 9. Referring to FIG. 9, gateway BSs 902 may be connected to the core network 910 by a fiber/wired backhaul link 901. Similarly, mesh BSs 904 may be connected to one or more of the gateway BSs 902 via wireless connection 903, and a mesh BS 907 may be wirelessly connected to one or more of the mesh BSs 904 via wireless connection 905. A UE 920 can be connected either to a mesh BS or to a gateway BS via a wireless access link 908. The DL backhaul traffic to mesh BS 904 can be routed from the core network 910 to gateway BS 902 through fiber/wired backhaul interfaces 901 and then transmitted to the BS 904 through the wireless interface 903.

The UL backhaul traffic from the mesh BS 904 may be transmitted through the wireless interface 903 to the gateway BS 902 and then routed to the core network 910 by the fiber/wired backhaul interface 901. Similarly the DL backhaul traffic to the mesh BS 907 may be routed from the core network 910 to the gateway BS 902 via the wired interface 901, and then transmitted via the wireless interface 903 to the mesh BS 904 and then via wireless interface 905 to the mesh BS 907. The immediate previous hop BS that provides a mesh BS/UE connectivity to the core network is referred to as a parent BS.

The mesh BSs 904, 907 with already existing single hop 903 or the multi-hop 903-905 backhaul interface to the gateway BS 902 or the core network 910 is referred to as a connected mesh BS. Similarly, the mesh BS 909 that currently does not have a backhaul interface to the core network 910 is referred to as a new mesh BS. For an in-band operation, the BS-BS backhaul interfaces 903, 905, may re-use the same frequency resource as the BS-UE access links 908, while for out-of-band operation, both backhaul/fronthaul and access link may use different frequency resources. For centralized control case, the fronthaul/backhaul traffic routing decisions for the mesh network may be made by the gateway BS or another entity within the core network. For the decentralized control, each BS may make the fronthaul/backhaul traffic routing decisions by itself.

Figure 10:
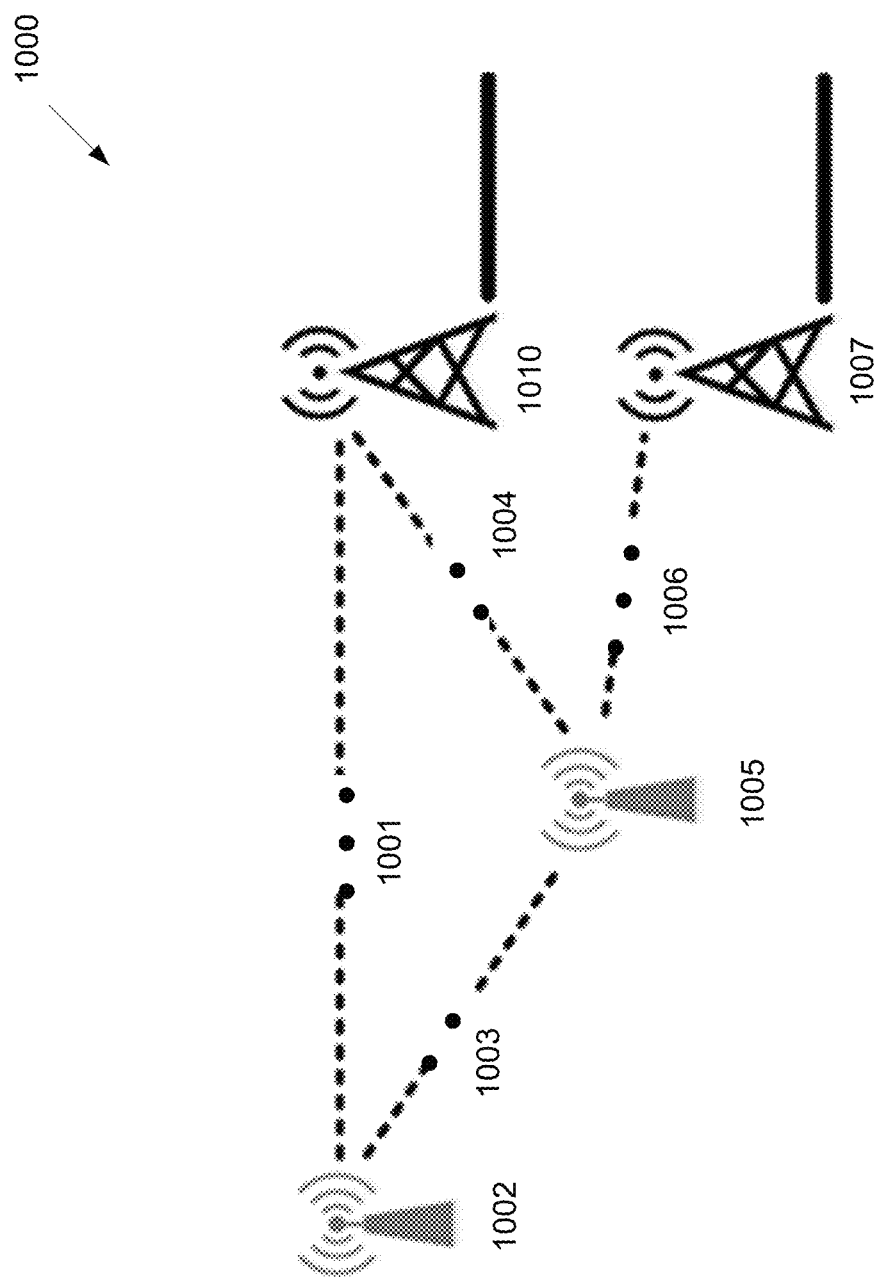
FIG. 10 illustrates an example of multi-path routing in mesh networks according to embodiments of the present disclosure.

FIG. 10 illustrates an example of multi-path routing in mesh networks 1000 according to embodiments of the present disclosure. For example, the network 1000 may be implemented in the network 900 in FIG. 9. The embodiment of the multi-path routing in mesh networks 1000 illustrated in FIG. 10 is for illustration only. FIG. 10 does not limit the scope of the present disclosure to any particular implementation.

A typical mesh BS in a wireless mesh network may have multiple paths to reach a gateway BS. As an illustrated in FIG. 10, a mesh node 1005 can reach a gateway BS through paths: 1004, 1003, 1001, or 1006. The routing of traffic through one or more of such routes is referred to as a multi-path routing. In one embodiment, multi-path routing may be used to steer traffic to be routed among the multiple paths based on the network condition. This provides load balancing capability and reduces the likelihood of a bottleneck or congestion in the network.

In another embodiment, a multi-path routing may be used to achieve diversity against fading and blockage of paths, by maintaining alternate paths to route traffic. This is especially useful for backhaul traffic which may have strict latency requirements. In yet another embodiment, since the quality of service (QoS) requirements can vary significantly based on the traffic type, a traffic requirement specific multi-path routing may be used to meet the QoS requirements. For example, a file transfer protocol (FTP) traffic may require high bandwidth but not high latency, while voice over internet protocol (VoIP) traffic may require a low latency but not high bandwidth.

The present disclosure provides a scheme for splitting backhaul traffic between the multiple paths in a mesh network.

In one embodiment 1, such traffic splitting can be performed at the bearer level, where bearer QoS can be optionally utilized for splitting. In one embodiment 2, traffic splitting can be performed at the packet level, where both the bearer QoS and the current network load can be optionally taken into consideration for splitting. In one embodiment 3, traffic splitting can be performed at the UL/DL level. Traffic splitting can be performed in a UE-specific manner, a cell-specific manner, a group-specific manner or any other possible way.

Along with QoS and network load considerations, the UE mobility and location may also be utilized to route traffic in the network, as discussed in embodiment 4. Splitting the traffic among the multiple paths can be made, for example, either by the serving gateway (S-GW), packet data network gateway (P-GW), mobility management entity (MME), a new network entity, the gateway BS or can be made independently by each BS in a distributed manner.

Figure 11:
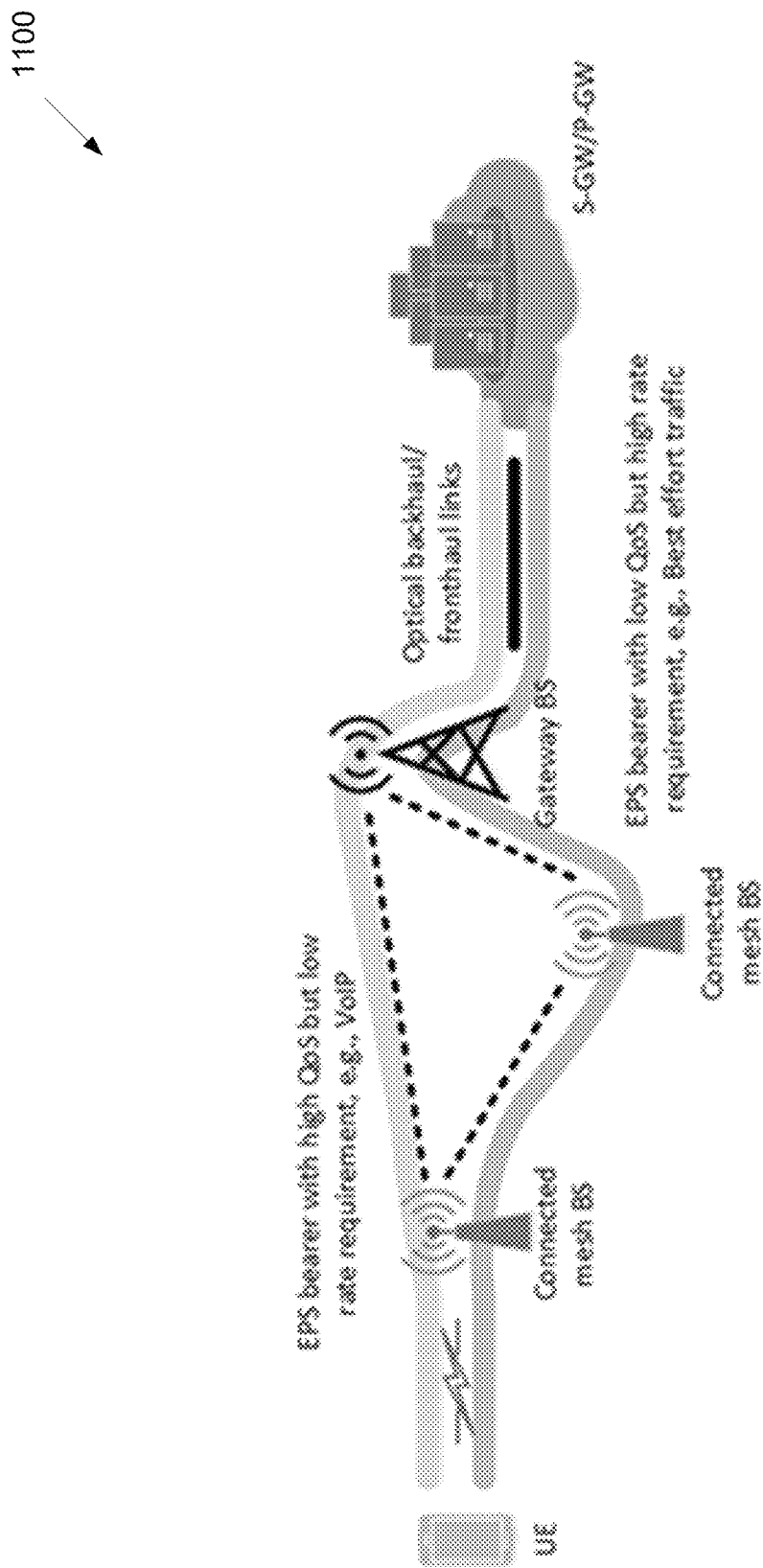
FIG. 11 illustrates an example of bearer level splitting of traffic in multi-path routing according to embodiments of the present disclosure.

FIG. 11 illustrates an example of bearer level splitting of traffic in multi-path routing in a network 1100 according to embodiments of the present disclosure. For example, the network 1100 may be implemented in the network 900 in FIG. 9. The embodiment of the bearer level splitting of traffic in multi-path routing illustrated in FIG. 11 is for illustration only. FIG. 11 does not limit the scope of the present disclosure to any particular implementation.

In one embodiment 1, bearer level splitting is provided. Since different traffic can have different QoS requirements, the optimal route for each type of traffic may be different. For example, in FIG. 11 the two hop path may be beneficial in terms of capacity but the one hop path may be beneficial in terms of latency. As an embodiment, a different path can be assigned for each traffic bearer to enable such traffic QoS specific steering. QoS parameters of the bearer or the service data flow (SDF), such as a QoS class identifier (QCI), allocation and retention priority (ARP), guaranteed bit rate (GBR), aggregate maximum bit rate (AMBR) can be used to determine an appropriate path for it.

For user plane traffic, in one embodiment the end-to-end path selection per bearer can be done by an existing or new core network entity. An existing core network entity can be, for example, an MME or a serving gateway (S-GW) or a packet data network gateway (P-GW). In such embodiment, path cost and route metrics for the mesh network may be provided to the core network entity to enable such selection.

In another embodiment, the core-network entity may set up the bearer up to the serving gateway BS, while the per bearer path from gateway BS to the mesh BS is determined by the gateway BS. In such embodiment, the path cost and route metrics for the mesh network may be shared with the gateway BS, while the mesh BS can be abstracted from the point of view of the core network entity. In yet another embodiment, the per bearer path at each mesh BS is determined by the corresponding mesh BS. In this embodiment, the path cost and next hop information can be shared among the mesh BSs.

In one embodiment, for the control plane traffic, different control plane bearers may be generated for each path used by the mesh BS for a UE to route the corresponding UE's user plane traffic. In another embodiment, a single control plane is created per UE even when the corresponding UE's user plane traffic is multi-path routed, which may contribute to a smaller control plane overhead.

Figure 12A:
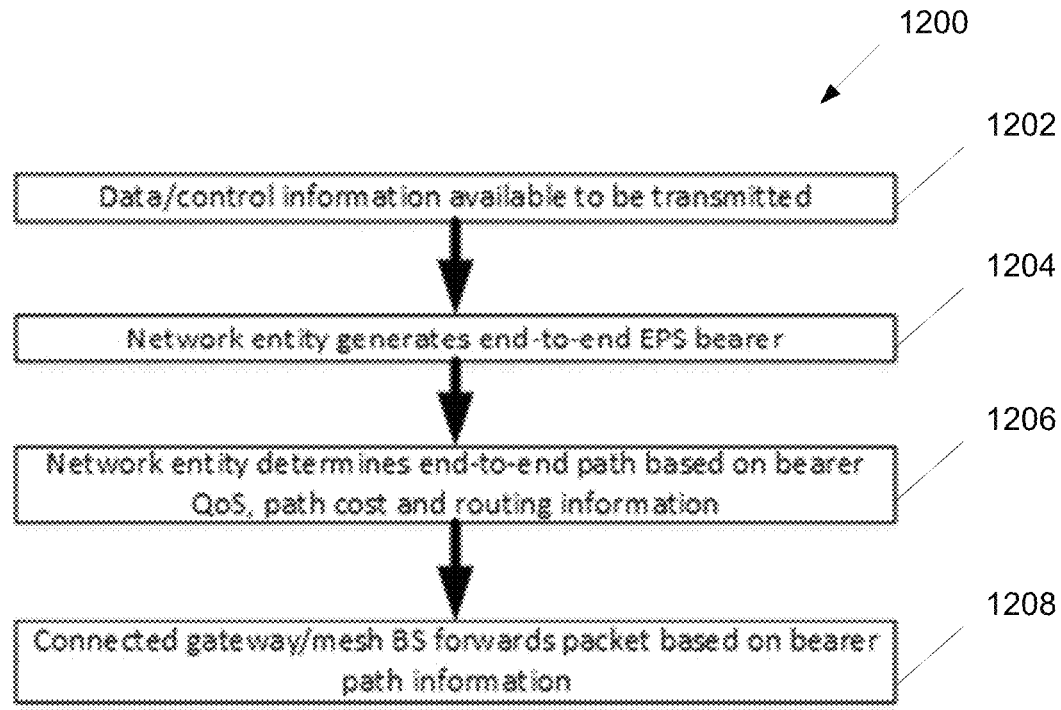
FIG. 12A illustrates a flowchart of a method for bearer level splitting by network entity according to embodiments of the present disclosure.

FIG. 12A illustrates a flowchart of a method 1200 for bearer level splitting by a network entity according to embodiments of the present disclosure. For example, the method 1200 may be performed by a network entity such as any one of those discussed above with regard to FIGS. 1 and/or 9. The embodiment of the bearer level splitting by network entity illustrated in FIG. 12A is for illustration only. FIG. 12A does not limit the scope of the present disclosure to any particular implementation.

As illustrated in FIG. 12A, the bearer level splitting by network entity begins at step 1202. In step 1202, it is determined that data/control information is available to be transmitted. Subsequently, in step 1204, a network entity generates end-to-end EPS bearer. Next, in step 1206, the network entity determines end-to-end path based on bearer QoS, path cost, and routing information. Then, in step 1208, a connected gateway/mesh BS forwards packet based on bearer path information.

Figure 12B:
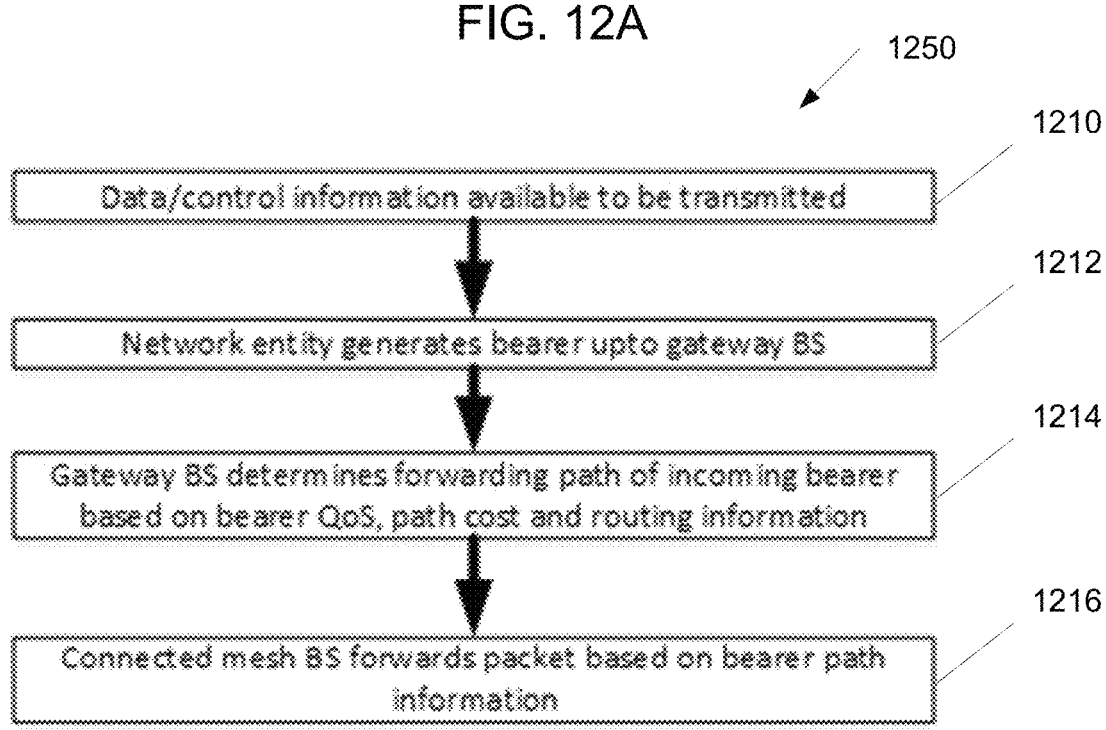
FIG. 12B illustrates a flowchart of a method for bearer level splitting by gateway BS according to embodiments of the present disclosure.

FIG. 12B illustrates a flowchart of a method 1250 for bearer level splitting by a gateway BS according to embodiments of the present disclosure. For example, the method 1250 may be performed by a gateway BS such as any one of those discussed above with regard to FIGS. 1 and/or 9. The embodiment of the bearer level splitting by the gateway BS illustrated in FIG. 12B is for illustration only. FIG. 12B does not limit the scope of the present disclosure to any particular implementation.

As illustrated in FIG. 12B, the bearer level splitting by gateway begins at step 1210. In step 1210, it is determined that data/control information is available to be transmitted. Subsequently, in step 1212, a network entity generates bearer up to a gateway BS. Next, in step 1214, the gateway BS determines forwarding path of incoming bearer based on bearer QoS, path cost, and routing information. Then, in step 1216, a connected mesh BS forwards packet based on bearer path information.

Figure 12C:
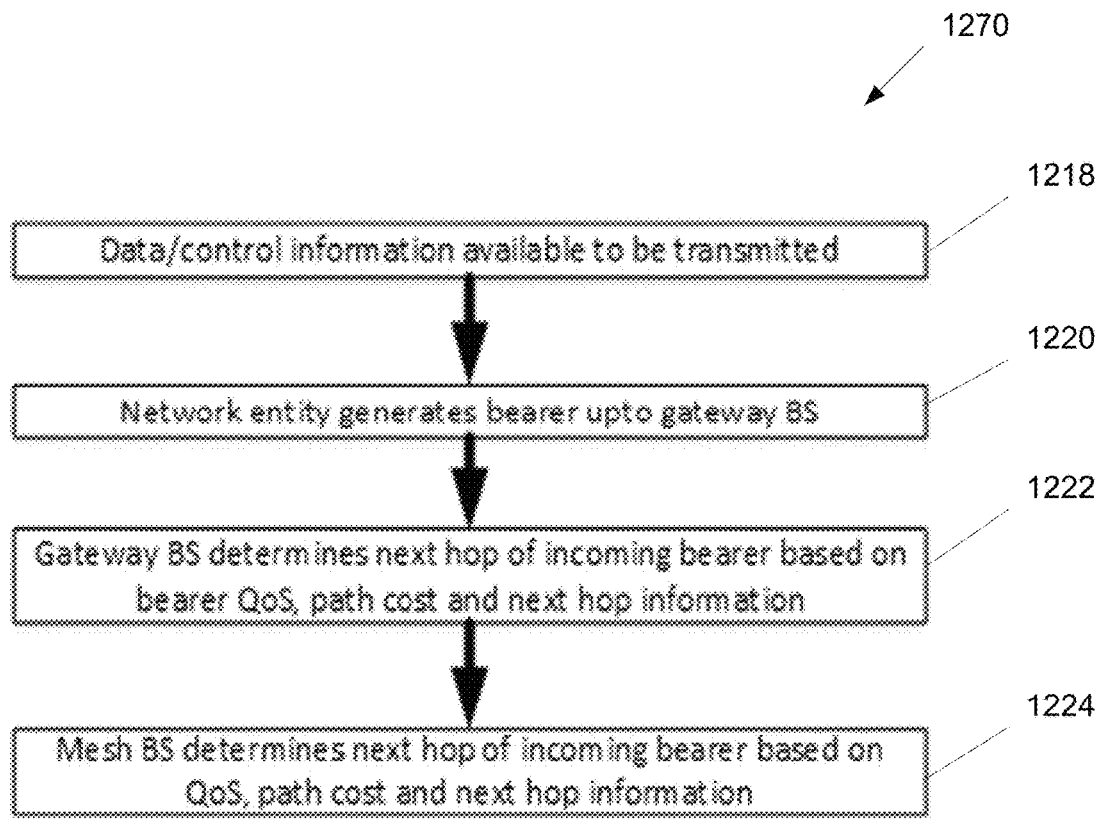
FIG. 12C illustrates a flowchart of a method for bearer level splitting by each mesh BS according to embodiments of the present disclosure.

FIG. 12C illustrates a flowchart of a method 1270 for bearer level splitting by a mesh BS according to embodiments of the present disclosure. For example, the method 1270 may be performed by a mesh BS such as any one of those discussed above with regard to FIGS. 1 and/or 9. The embodiment of the bearer level splitting by each mesh BS illustrated in FIG. 12C is for illustration only. FIG. 12C does not limit the scope of the present disclosure to any particular implementation.

As illustrated in FIG. 12C, the bearer level splitting by each mesh BS begins at step 1218. In step 1218, it is determined that data/control information is available to be transmitted. Subsequently, in step 1220, a network entity generates bearer up to gateway BS. Next, in step 1222, a gateway BS determines next hop of incoming bearer based on bearer QoS, path cost, and next hop information. Then, in step 1224, a mesh BS determines next hop of incoming bearer based on QoS, path cost, and next hop information.

Figure 13:
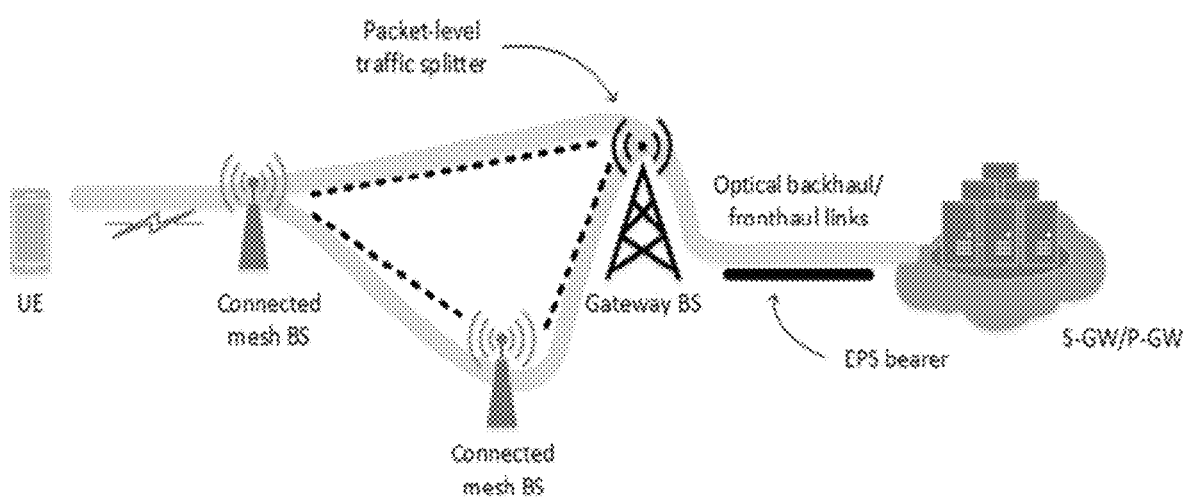
FIG. 13 illustrates an example of packet level splitting of traffic in multi-path routing according to embodiments of the present disclosure.

FIG. 13 illustrates an example of packet level splitting of traffic in multi-path routing in a network 1300 according to embodiments of the present disclosure. For example, the network 1300 may be implemented in the network 900 in FIG. 9. The embodiment of the packet level splitting of traffic in multi-path routing illustrated in FIG. 13 is for illustration only. FIG. 13 does not limit the scope of the present disclosure to any particular implementation.

In various embodiments, one bearer may be mapped to more than one routes and the routing decisions are made on a per packet or group of packets basis. Thus packets from a single bearer can propagate through multiple paths of the network. A hub BS is defined as a BS with one or multiple outgoing links for a particular traffic bearer.

In various embodiments, for user plane traffic, the end-to-end multi-path selection per bearer can be done by a core network entity. The core network entity can be, for example, an MME or a S-GW/P-GW or a new network entity. However the individual packets of the bearer may use any of the selected multiple paths determined by the core network entity for the bearer. In such embodiment, path cost and route metrics for the mesh network can be provided to the core network entity to enable such multi-path selection.

Furthermore the possible paths may not change unless the core network entity reconfigures. In another embodiment, the configuration of end-to-end multiple paths to a bearer is performed by a core network entity from core network to a UE but the actual traffic steering at a hub BS along a route is performed by the hub BS itself. In such embodiment, the hub BS can take metrics related to route congestions into account. In another embodiment, the core network entity sets up the bearer up to the serving gateway BS, while the gateway BS may determine the entire path taken by each incoming packet based on the network load information, cost metrics and/or the corresponding QoS requirements.

In various embodiments, the core-network entity may set up the bearer up to the serving gateway BSs, while each mesh BS can independently determine the next hop node to forward an incoming packet without predetermined path(s), based on the information such as destination, cost and the load i.e., the path is determined in a distributed fashion. Since the entire path may not be seen by the core network entity, a smaller signalling overhead may be required in these embodiments.

In various embodiments, for the control plane, the control plane traffic for a UE can be sent through one of the many paths determined by the core network entity. In another embodiment, the control plane traffic is dynamically split on a per packet basis.

Figure 14A:
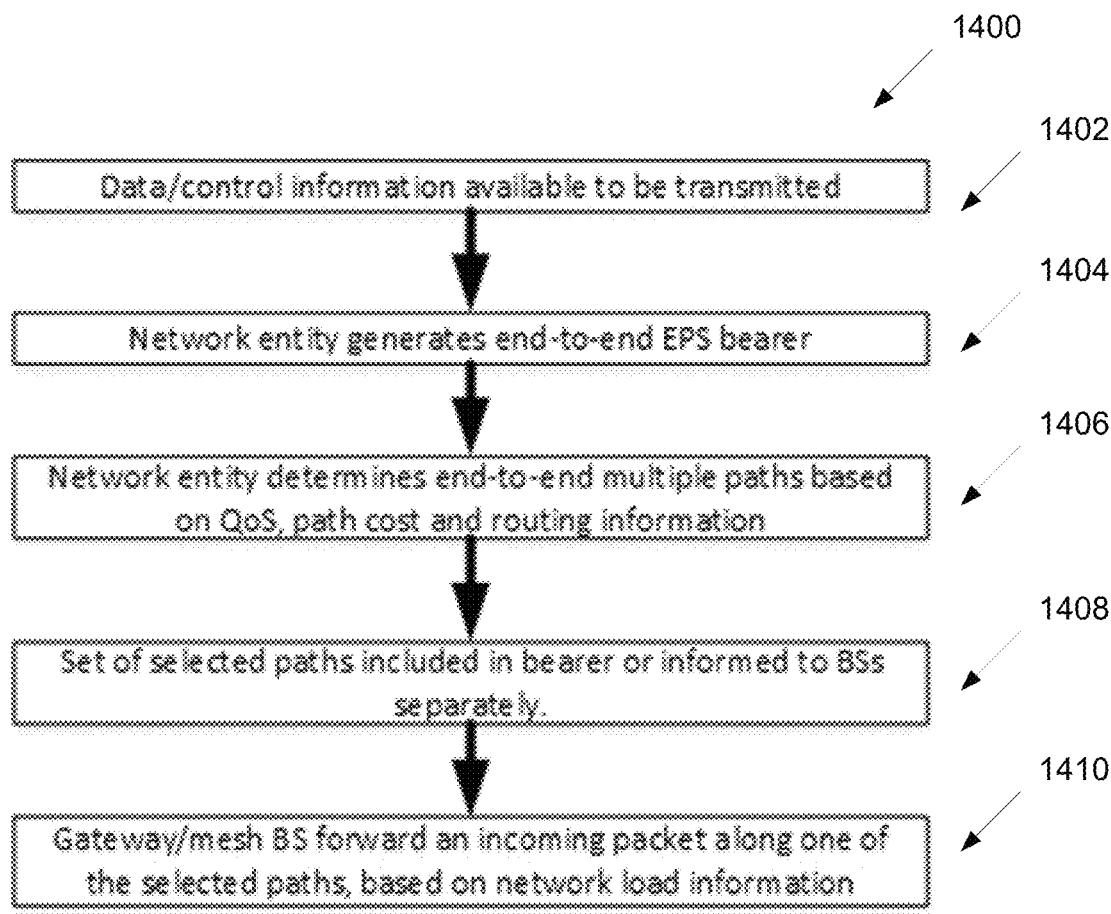
FIG. 14A illustrates a flowchart of a method for packet level splitting-end-to end bearer by network entity according to embodiments of the present disclosure.

FIG. 14A illustrates a flowchart of a method 1400 for packet level splitting end-to end bearer by network entity with packet level splitting by each BS according to embodiments of the present disclosure. For example, the method 1400 may be performed by a network entity such as any one of those discussed above with regard to FIGS. 1 and/or 9. The embodiment of the packet level splitting-end-to-end bearer illustrated in FIG. 14A is for illustration only. FIG. 14A does not limit the scope of the present disclosure to any particular implementation.

As illustrated in FIG. 14A, the method 1400 for bearer level splitting end-to-end bearer begins at step 1402. In step 1402, it is determined that data/control information is available to be transmitted. Subsequently, in step 1404, a network entity generates end-to-end EPS bearer. Next, in step 1406, the network entity determines end-to-end multiple paths based on bearer QoS, path cost, and routing information. Next, in step 1408, the network entity determines a set of selected paths included in bearer or informed to BSs separately. Then, in step 1410, a gateway/mesh BS forward an incoming packet along one of the selected paths, based on network load information.

Figure 14B:
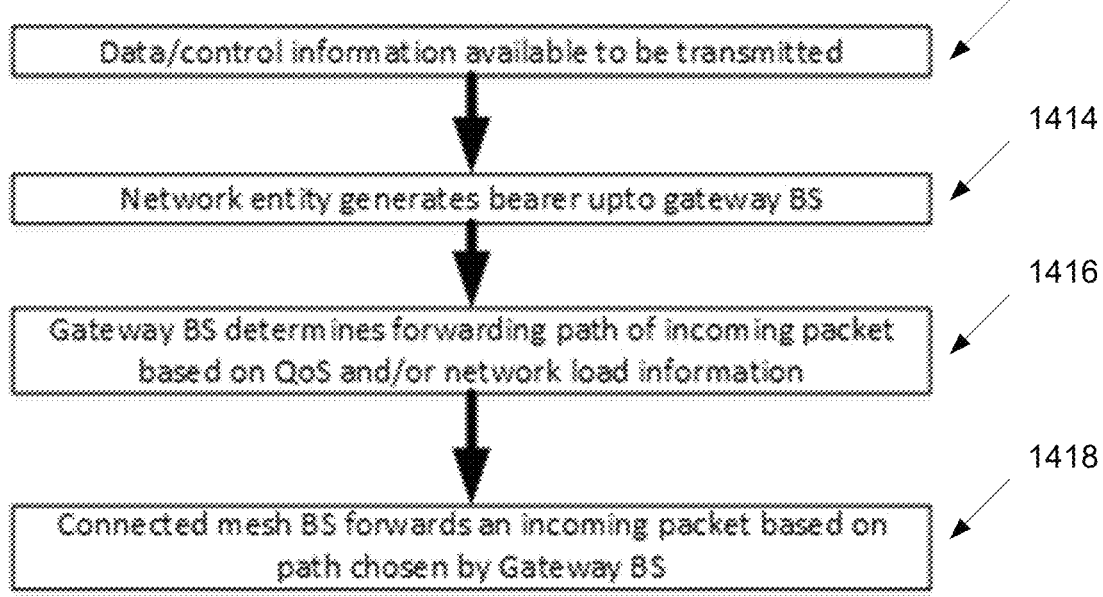
FIG. 14B illustrates a flowchart of a method for packet level bearer splitting up to a gateway BS, with packet level splitting by a gateway BS according to embodiments of the present disclosure.

FIG. 14B illustrates a flowchart of a method 1450 for packet level bearer splitting up to gateway BS, with packet level splitting by a gateway BS according to embodiments of the present disclosure. For example, the method 1450 may be performed by a gateway BS such as any one of those discussed above with regard to FIGS. 1 and/or 9. The embodiment of the packet level bearer splitting illustrated in FIG. 14B is for illustration only. FIG. 14B does not limit the scope of the present disclosure to any particular implementation.

As illustrated in FIG. 14B, the method for bearer level splitting end-to-end bearer begins at step 1412. In step 1412, data/control information is available to be transmitted. Subsequently, in step 1414, a network entity generates bearer up to gateway BS. Next, in step 1416, a gateway BS determines forwarding path of incoming packet based on QoS and/or network load information. Then, a connected mesh BS forwards an incoming packet based on path chosen by the gateway BS.

Figure 14C:
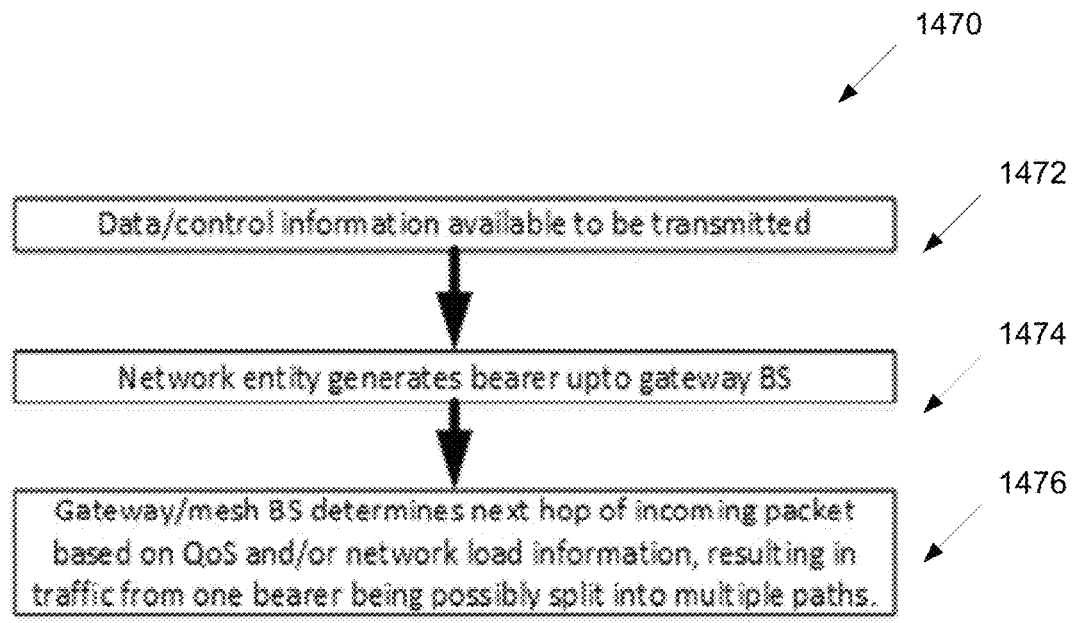
FIG. 14C illustrates a flowchart of a method for packet level bearer splitting up to a gateway BS with packet level splitting by intermediate gateway/mesh BSs according to embodiments of the present disclosure.

FIG. 14C illustrates a flowchart of a method 1470 for packet level bearer splitting up to gateway BS with packet level splitting by intermediate gateway/mesh BSs according to embodiments of the present disclosure. For example, the method 1470 may be performed by a BS such as any one of those discussed above with regard to FIGS. 1 and/or 9. The embodiment of the packet level bearer splitting illustrated in FIG. 14C is for illustration only. FIG. 14C does not limit the scope of the present disclosure to any particular implementation.

As illustrated in FIG. 14C, the method 1470 for bearer level splitting end-to-end bearer begins at step 1472. In step 1472, data/control information is available to be transmitted. Subsequently, in step 1474, a network entity generates bearer up to gateway BS. Then, in step 1476, a gateway/mesh BS determines next hop of incoming packet based on QoS and/or network load information, resulting in traffic from one bearer being possibly split into multiple paths.

In one embodiment 3, UL/DL splitting is provided. The UL and DL communication channels may typically be non-reciprocal, due to for example, non-reciprocity of the hardware, e.g., Tx/Rx RF chain, or difference in localized interference patterns, available transmit power, queue lengths etc. Consequently the optimal routing paths for UL and DL traffic may be different. Therefore this embodiment describes a method for performing independent routing decisions for the UL and DL data traffic.

Figure 15:
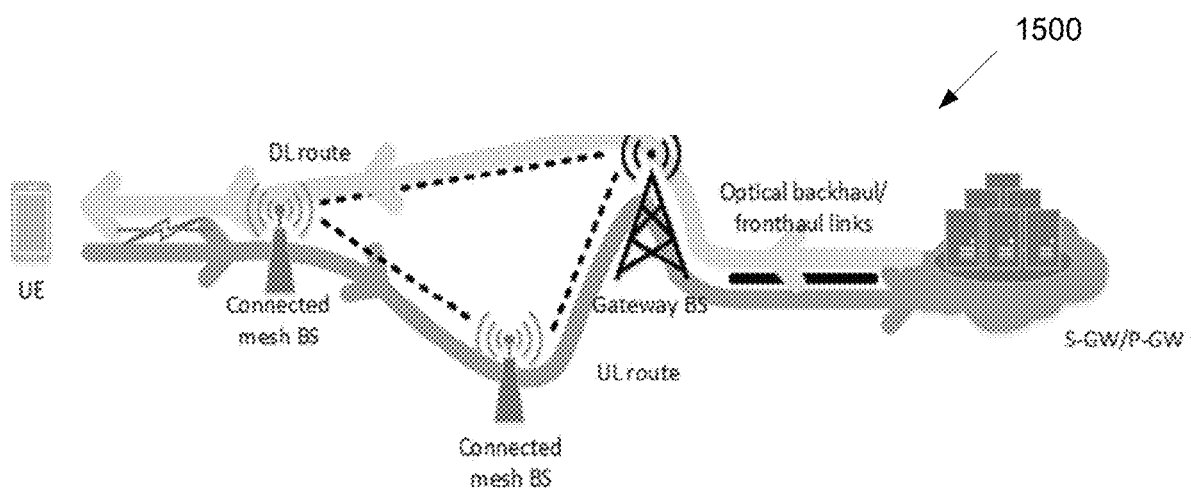
FIG. 15 illustrates an example of UL/DL traffic splitting in mesh networks according to embodiments of the present disclosure.

FIG. 15 illustrates an example of UL/DL traffic splitting in a mesh network 1500 according to embodiments of the present disclosure. For example, the network 1500 may be implemented in the network 900 in FIG. 9. The embodiment of the UL/DL traffic splitting in mesh networks 1500 illustrated in FIG. 15 is for illustration only. FIG. 15 does not limit the scope of the present disclosure to any particular implementation.

In one embodiment, cost metrics may be computed separately for the UL and DL paths. In one embodiment, the DL cost to child BSs can be computed at a parent BS by transmitting a reference signal (RS) or a synchronization signal block (SSB) and receiving feedback from the child BSs. In another embodiment, the DL cost of a link can be estimated by the parent BS by observing an RS and/or SSB transmitted from the child BS, and by compensating for the difference in transmit power level. For example, if the transmit power at a parent BS is A dB higher than at a child mesh BS, then the DL signal-to-noise ratio (SNR) can be inferred to be (approximately) A dB higher than the UL SNR obtained from a child BS RS. Such transmit power level can be obtained, for example, using the RS transmit power information in system broadcast information.

In one embodiment, the UL cost at a child mesh BS can be estimated by observing the SSB transmitted by the parent mesh BS and compensating for the transmit power level using system broadcast information. In another embodiment, a reverse direction radio resource measurement (RRM) block can be introduced for UL cost computation, where the parent BS can also provide feedback for an RS and/or SSB received from a child mesh BS.

In one example, the reverse directional RRM block may be new or may be an existing one. For instance, if a child BS transmits certain signal, e.g., SSB, for neighbor discovery purpose or for own access links, such signal can be used to provide the channel state information feedback from a parent BS to the child BS. In such embodiment, for example, a child BS can send a radio resource control (RRC) message indicating the types of measurement to the parent BS and the parent BS sends an RRC message that includes information on the measurement for the link from the child BS to the parent BS.

Figure 16:
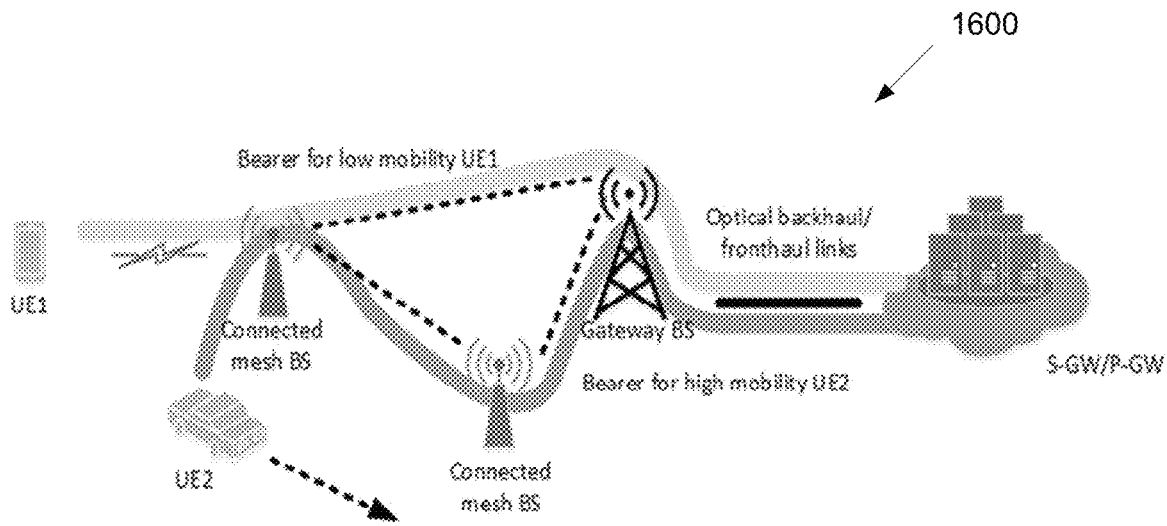
FIG. 16 illustrates an example of UE location/mobility aware routing according to embodiments of the present disclosure.

FIG. 16 illustrates an example of UE location/mobility aware routing in a network 1600 according to embodiments of the present disclosure. For example, the network 1600 may be implemented in the network 900 in FIG. 9. The embodiment of the UE location/mobility aware routing illustrated in FIG. 16 is for illustration only. FIG. 16 does not limit the scope of the present disclosure to any particular implementation.

In one embodiment, a path selection for each UE is performed using the UE location/mobility information. Such UE specific routing paths may be efficient in handling UE mobility induced blockage and handovers. As an example, but not as a limitation, traffic for high mobility UEs may be assigned a path such that the serving mesh BS is a macro-BS with a larger coverage radius. In another example, the current UE direction of motion information can be used to predict a handover and accordingly assign a route for the UE traffic that requires minimal re-routing upon handover, as illustrated in FIG. 16.

In one embodiment, for user plane traffic, the end-to-end path selection per UE IP address is done by a core network entity. This core network entity can be, for example, an MME or a S-GW/P-GW. In such embodiment, path cost and UE mobility/location information for the mesh network may be provided to the core network entity to enable such selection.

In another embodiment, the core network entity may set up the bearers up to the serving gateway BS, while the path from the gateway BS to a UE is determined by the gateway BS. In such embodiment, path cost and UE mobility/location information for the mesh network may be provided to the gateway BS, while the mesh network may be abstracted from the point of view of the core network entity. In another embodiment, the core network entity may set up bearers up to the serving gateway BS, while each gateway/mesh BS independently determines the next hop for forwarding an incoming bearer/packet based on path cost, UE mobility/location information and route metrics for the mesh network. Flowcharts for example implementations of such embodiments are illustrated in FIGS. 17A, 17B, and 17C.

Figure 17A:
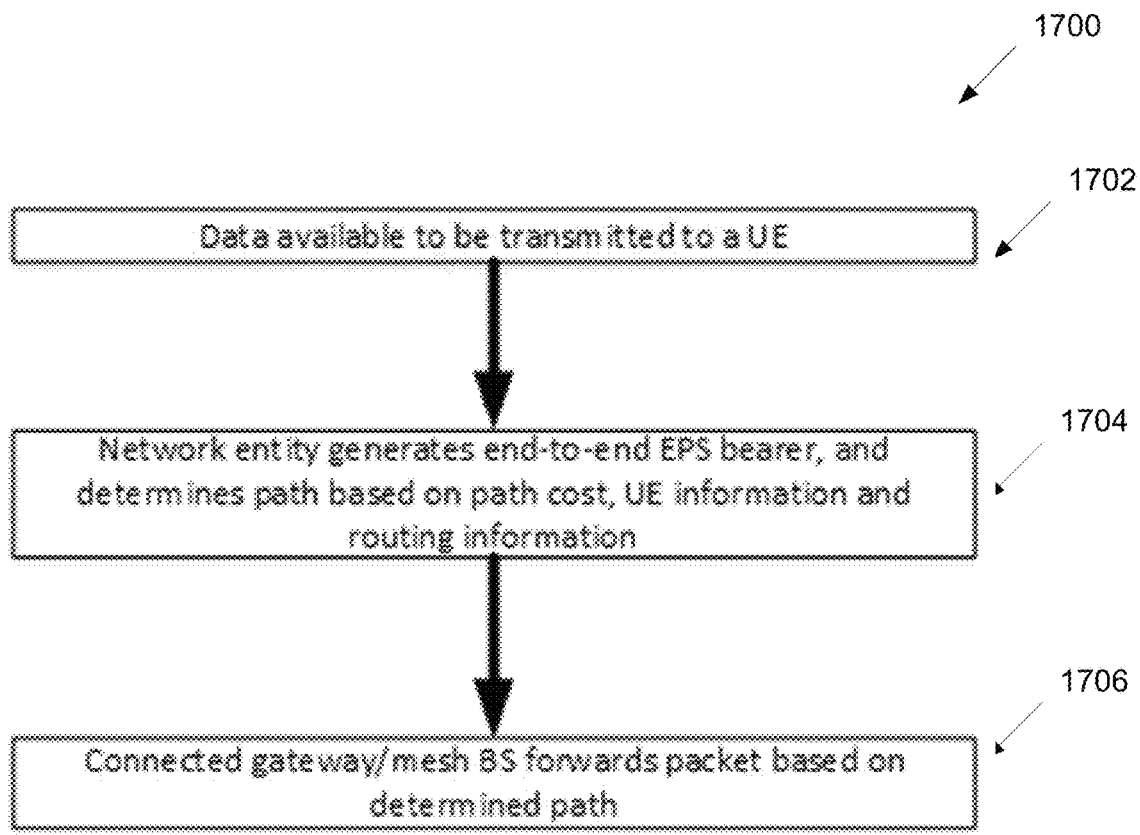
FIG. 17A illustrates a flowchart of a method for UE location/mobility aware routing-path determination by network entity according to embodiments of the present disclosure.

FIG. 17A illustrates a flowchart of a method 1700 for a UE location/mobility aware routing-path determination by network entity according to embodiments of the present disclosure. For example, the method 1700 may be performed by a network entity such as any one of those discussed above with regard to FIGS. 1 and/or 9. The embodiment of the UE location/mobility aware routing-path determination illustrated in FIG. 17A is for illustration only. FIG. 17A does not limit the scope of the present disclosure to any particular implementation.

As illustrated in FIG. 17A, the method 1700 for UE location/mobility aware routing-path determination begins at step 1702. In step 1702, it is determined that data is available to be transmitted to a UE. Subsequently, in step 1704, a network entity generates end-to-end EPS bearer, and determines path based on path cost, UE information, and routing information. Then, in step 1706, a connected gateway/mesh BS forwards packet based on the determined path.

Figure 17B:
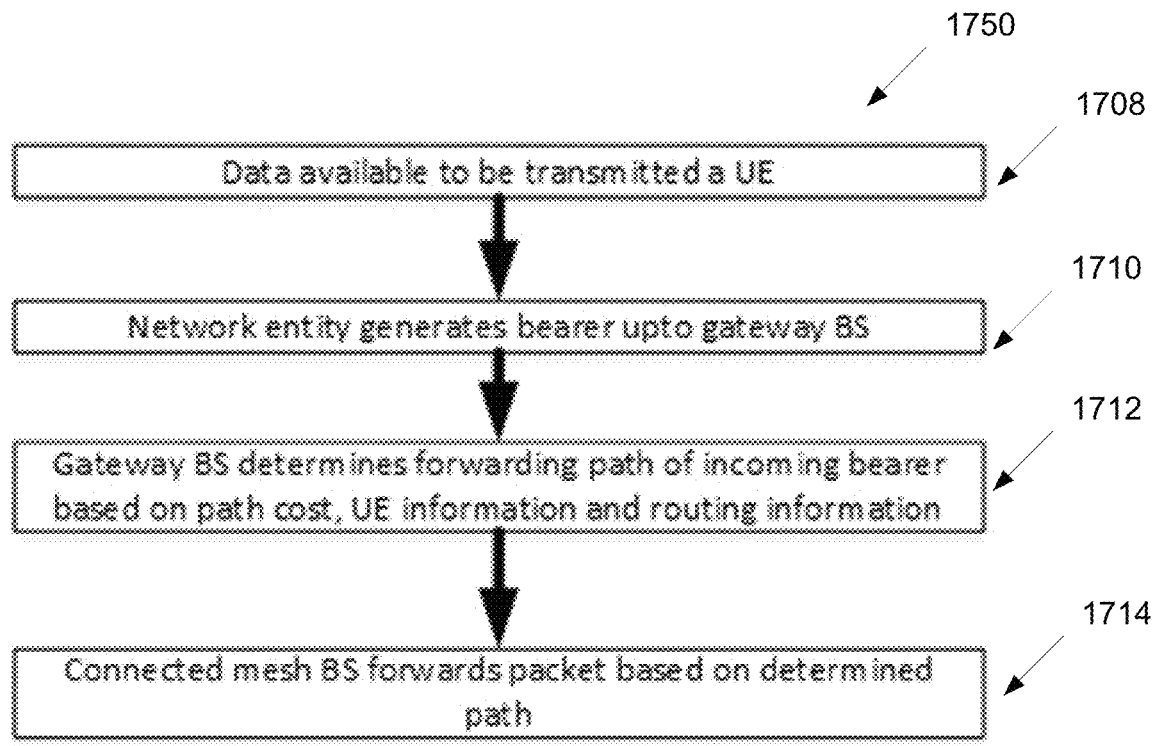
FIG. 17B illustrates a flowchart of a method for UE location/mobility aware routing-path determination by gateway BS according to embodiments of the present disclosure.
Figure 17C:
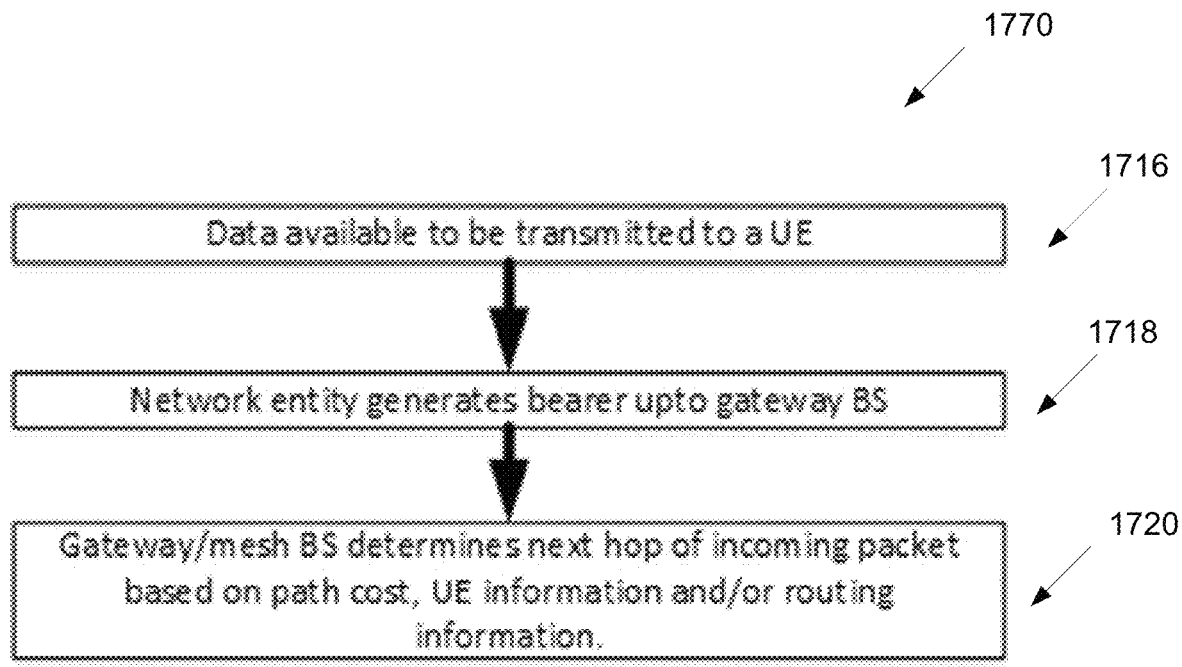
FIG. 17C illustrates a flowchart of a method for UE location/mobility aware routing-path determination by each intermediate gateway/mesh BS according to embodiments of the present disclosure.

FIG. 17B illustrates a flowchart of a method 1750 for a UE location/mobility aware routing-path determination by a gateway BS according to embodiments of the present disclosure. For example, the method 1750 may be performed by a gateway BS such as any one of those discussed above with regard to FIGS. 1 and/or 9. The embodiment of the UE location/mobility aware routing-path determination illustrated in FIG. 17B is for illustration only. FIG. 17B does not limit the scope of the present disclosure to any particular implementation.

As illustrated in FIG. 17B, the method 1750 for a UE location/mobility aware routing-path determination begins at step 1708. In step 1708, it is determined that data is available to be transmitted to a UE. Subsequently, in step 1710, a network entity generates bearer up to gateway BS. Next, in step 1712, a gateway BS determines forwarding path of incoming bearer based on path cost, UE information, and routing information. Then, in step 1714, a connected mesh BS forwards packet based on the determined path.

FIG. 17C illustrates a flowchart of a method 1770 for a UE location/mobility aware routing-path determination by each intermediate gateway/mesh BS according to embodiments of the present disclosure. For example, the method 1770 may be performed by a gateway/mesh BS such as any one of those discussed above with regard to FIGS. 1 and/or 9. The embodiment of the UE location/mobility aware routing-path determination illustrated in FIG. 17C is for illustration only. FIG. 17C does not limit the scope of the present disclosure to any particular implementation.

As illustrated in FIG. 17C, the method for the UE location/mobility aware routing-path determination begins at step 1716. In step 1716, it is determined that data is available to be transmitted to a UE. Subsequently, in step 1718, a network entity generates bearer up to gateway BS. Then, in step 1720, a gateway/mesh BS determines next hop of incoming packet based on path cost, UE information and/or routing information.

In various embodiments, such UE mobility/location information may be estimated by the parent BS using, for example, the beam index, RSSI, RSRP, RSRQ information, and frequency of beam update. In another embodiment, UE mobility/location information is estimated by measuring Doppler shift at a parent BS. In another embodiment, the UE feeds mobility information to a parent mesh BS of the UE. This mobility information may further be forwarded to other mesh BSs, the gateway BS and/or core network entity to enable path selection according to the different embodiments in the previous paragraph. In one example, the UE can estimate mobility/location information of the UE from signals transmitted from multiple BSs using, e.g., triangulation method. In another example, the UE can estimate mobility/location information from GPS, gyroscope, accelerometer etc.

In one embodiment, the UE control plane traffic can be routed along a UE specific path in a similar way to the user plane traffic. The path selection can be performed at, for example, a core network entity, a gateway BS or at intermediate each mesh BS.

In one embodiment, such traffic splitting can be performed at the bearer level, where bearer QoS can be optionally utilized for splitting. In another embodiment, traffic splitting can be performed at the packet level, where both the bearer QoS and the current network load can be optionally taken into consideration for splitting. In yet another embodiment, traffic splitting can be performed at the UL/DL level. Traffic splitting can be performed in a UE-specific manner, a cell-specific manner, a group-specific manner or any other possible way.

FIG. 18 illustrates an example of load aware dynamic traffic steering in a network 1800 according to embodiments of the present disclosure. For example, the network 1800 may be implemented in the network 900 in FIG. 9. The embodiment of load aware dynamic traffic steering illustrated in FIG. 18 is for illustration only. FIG. 18 does not limit the scope of the present disclosure to any particular implementation.

In one embodiment, to use network load as the metric for splitting traffic, each mesh BS may share the network load, congestion, or delay feedback information with other BSs, e.g., the previous hop BSs. This congestion feedback information can be utilized by the BSs to dynamically steer incoming packets based on the current network condition.

In one embodiment, this feedback information may include the queue buffer status, the packet sojourn time (e.g., from the instance of arrival of a packet at a receive buffer to the instance of removal from the transmit buffer), highest successfully transmitted packet data convergence protocol (PDCP) packet data unit (PDU) sequence number (SN), etc.

In one embodiment, the reported information is instantaneous metrics while in another embodiment average metrics may be reported. For computing average metric, a window can be defined to compute the metric and the window size may be fixed or configurable. In one embodiment, the feedback information may be shared periodically. In another embodiment the feedback information may be shared aperiodically based on a trigger by a channel condition or a network event, such as (but not restricted to) a buffer size or delay exceeding a threshold value. In yet another embodiment, the feedback information may be shared with the parent BS based on a request by the parent BS, or vice versa.

In one embodiment, the metrics are computed per bearer. In another embodiment, the metrics are computed per QCI. In yet another embodiment the metrics may be computed per link, averaged over the bearers. In yet another embodiment, the metrics may be computed per flow. In yet another embodiment, the metrics may be computed per UE, whose traffic is being served over the link. In one embodiment, the computed metrics may be different for the UL and the DL, while a common metric may be computed for both the UL and DL paths.

In various embodiments, the congestion feedback information is exchanged and used in the network to make scheduling decisions. For example, the congestion feedback is exchanged between immediate hop BSs (e.g., mesh BS 907 and mesh BS 904 in FIG. 9). The congestion feedback can be forwarded to BSs with more than one hop counts, including a gateway BS. Intermediate BS can separately forward each feedback or combine multiple congestion feedbacks from multiple child BSs before forwarding. (e.g., mesh BS 904 forwarding feedback from mesh BSs 909 and 907 in FIG. 9). Thereafter, the gateway BS or the core network can use this congestion feedback information, for example, to determine a resource pattern for the BSs to use in the network. In some embodiments, each mesh BS can schedule a link experiencing high congestion with high priority depending, for example, on the priority of the traffic (e.g., QoS level). Additionally, or alternatively, each mesh BS can schedule a link with higher differential congestion information with high priority, for example, resources can be allocated with greater priority to those BSs with higher relative congestions.

FIG. 19A illustrates a flowchart of a method 1900 for load information sharing with parent BS to enable traffic splitting according to embodiments of the present disclosure. For example, the method 1900 may be performed by a child BS such as any one of those discussed above with regard to FIGS. 1 and/or 9. The embodiment of the method 1900 illustrated in FIG. 19A is for illustration only. FIG. 19A does not limit the scope of the present disclosure to any particular implementation.

As illustrated in FIG. 19A, the method 1900 begins at step 1902. In step 1902, the child BS is triggered to share load and/or congestion feedback information by a clock or an event (e.g., periodically, upon request, or based on load or congestion level). Subsequently, the child BS shares load information with a parent BS.

FIG. 19B illustrates a flowchart of a method 1950 for load information sharing with parent BS to enable traffic splitting according to embodiments of the present disclosure. For example, the method 1950 may be performed by a child BS such as any one of those discussed above with regard to FIGS. 1 and/or 9. The embodiment of the method 1950 illustrated in FIG. 19B is for illustration only. FIG. 19B does not limit the scope of the present disclosure to any particular implementation.

As illustrated in FIG. 19B, the method 1950 begins at step 1906. In step 1906, the child BS receives a load sharing request from a parent BS. Subsequently, the child BS shares load information with the parent BS. In various embodiments for the load information sharing, a inter-BS bandwidth allocation requests (BAR) is supported, which is defined as a message transmitted from one BS to another BS in a mesh network containing information about bandwidth allocation request. One of such bandwidth allocation request information can be the transmit buffer size at the BS sending the BAR message.

In one example, bandwidth allocation information may indicate how much buffer size is available to receive data. The BAR message can be used for both UL and DL traffic. Upon the reception of BAR, the recipient may take necessary actions. For instance, for UL traffic, the parent mesh BS may send out a grant for UL transmission to the child mesh BS who sent the BAR.

In yet another example, for DL traffic, the parent mesh BS may acquire available receiver buffer size at the child mesh BS. In one embodiment, such BAR for DL traffic can be used for DL flow control at the parent BS.

In various embodiments for the load information sharing, a child mesh BS sends BAR to connected parent mesh BSs for UL. This embodiment can be applied to any of the splitting options aforementioned. In one embodiment, the UL BAR message is sent from a child mesh BS to a parent mesh BS(s) upon the arrival of traffic in an upstream data buffer. In one example, it can be such that the UL BAR is sent only when higher priority traffic than what are currently buffered arrives.

In various embodiments for the load information sharing, the UL BAR message is sent in a periodic manner. In yet another embodiment, the UL BAR message is included whenever an allocated UL bandwidth is not fully utilized and there is an unused resourced to be zero-padded. In yet another embodiment, the UL BAR can be sent upon the reception of request message from a parent BS. Consider the packet level splitting option above in which packets corresponding to one bearer can be transmitted along different paths.

To support such functionality, in various embodiments, the UL BAR from a child BS can be sent to multiple parent mesh BSs. For example, the contents of multiple UL BARs are such that the sum of the requested bandwidth amounts is based on the bandwidth amount requested when the UL BAR is sent only to a single parent BS, i.e., splitted. This splitting of the buffer size across the different paths may be performed using the path cost and routing metrics.

In one embodiment, there is a certain threshold such that if the required bandwidth allocation amount is smaller than the threshold, the UL BAR may be sent to only one parent BS. This threshold can be set per bearer, per logical channel group, logical channel, or per UE. In one embodiment, there is a notion of a default path and when UL BAR is sent to only one parent BS, the default path is assumed.

In another embodiment, a child mesh BS sends BAR to connected parent mesh BSs for DL. This embodiment can be applied to any of the splitting options aforementioned. In one embodiment, the BAR message includes the available DL receiver buffer size from the parent mesh BS. Such information can be utilized to re-route DL traffic and prevent buffer overflows in mesh BSs.

In one embodiment, the DL BAR may be sent periodically. In another embodiment, the DL BAR may be sent aperiodically upon the reception of request message. In yet another embodiment, the DL BAR may be sent based on a certain trigger, e.g., when the available Rx buffer size falls below a certain threshold. In yet another embodiment, DL BAR may be sent upon the reception of request message from a parent BS. In one embodiment, the DL BAR is also split into different paths, with each path only reporting a fractional buffer space to each parent BS. The sum of all reported fractional buffer spaces can be equal to or almost the same as the total available buffer space. In one embodiment, this fractional buffer space reported may be proportional to the bearer QCI or GBR.

Figure 20A:
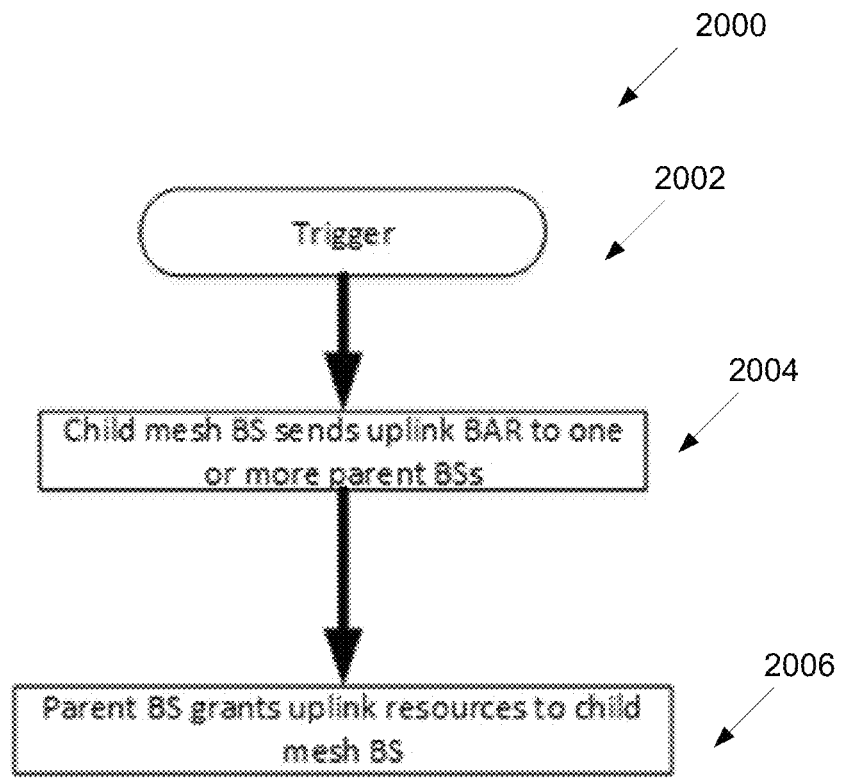
FIG. 20A illustrates a flowchart of a method for UL BARs to support traffic splitting according to embodiments of the present disclosure.

FIG. 20A illustrates a flowchart of a method 2000 for UL BARs to support traffic splitting according to embodiments of the present disclosure. For example, the method 2000 may be performed by a child BS such as any one of those discussed above with regard to FIGS. 1 and/or 9. The embodiment of the method 2000 illustrated in FIG. 20A is for illustration only. FIG. 20A does not limit the scope of the present disclosure to any particular implementation.

As illustrated in FIG. 20A, the method 2000 begins at step 2002. In step 2002, the child BS identifies a trigger for the UL BAR (which may be any of the triggers discussed above). Subsequently, in step 2004, the child mesh BS sends UL BAR to one or more parent BSs. Then, in step 2006, the parent BS grants UL resource to child mesh BS. For example, in some embodiments, the UL BAR can indicate the transmit buffer size at the child mesh BS to parent mesh BS. The UL BAR can be split and sent to multiple parent mesh BSs. The multiple UL BARs are such that the sum of the requested bandwidth amounts is the same to when the BAR is sent to only one parent BS. The child BS may use a certain threshold such that if the requested bandwidth allocation amount is smaller than the threshold, the child BS sends the UL BAR to only one parent BS. The UL BAR may be sent periodically, aperiodically, or upon the arrival of traffic in its upstream data buffer.

Figure 20B:
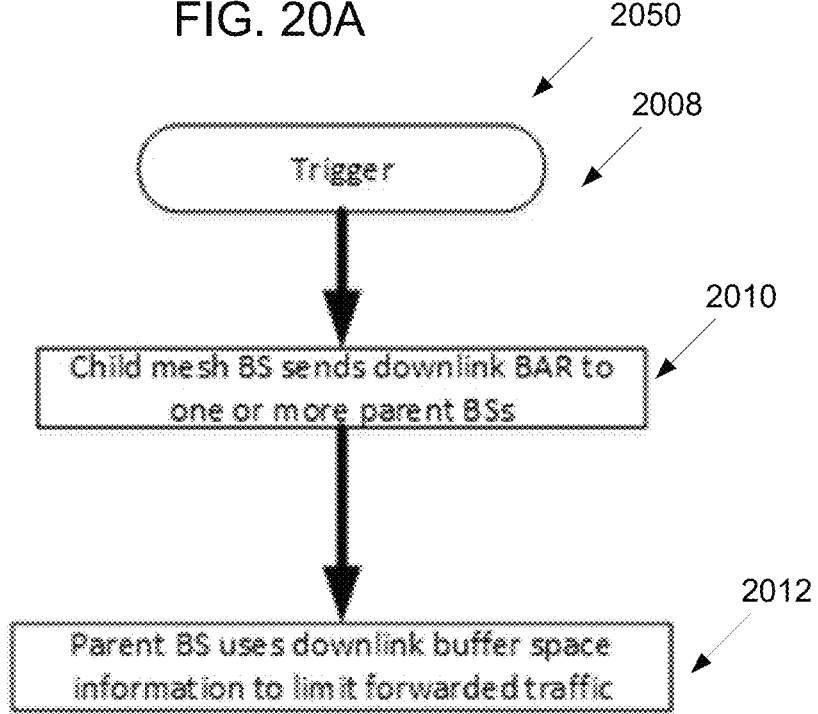
FIG. 20B illustrates a flowchart of a method for DL BARs to support traffic splitting according to embodiments of the present disclosure.

FIG. 20B illustrates a flowchart of a method 2050 for DL BARs to support traffic splitting according to embodiments of the present disclosure. For example, the method 2050 may be performed by a child BS such as any one of those discussed above with regard to FIGS. 1 and/or 9. The embodiment of the method 2050 illustrated in FIG. 20B is for illustration only. FIG. 20B does not limit the scope of the present disclosure to any particular implementation.

As illustrated in FIG. 20B, the method 2050 begins at step 2008. In step 2008, the child BS identifies a trigger for the DL BAR (which may be any of the triggers discussed above). Subsequently, in step 2010, a child mesh BS sends DL BAR to one or more parent BSs. Then, in step 2012, the parent BS uses DL buffer space information to limit forward traffic to the BS (e.g., to prevent overflow to the child BS). For example, the DL BAR can indicate the available RX buffer size at the child mesh BS to the parent mesh BS, i.e., congestion indicator. The parent mesh BS may perform congestion control based on this information. For example, in some embodiments, the DL BAR can be split and sent to multiple parent mesh BSs. The multiple DL BARs are such that the sum of the requested bandwidth amounts is the same to when the BAR is sent to only one parent BS. The child BS may use a certain threshold such that if the requested bandwidth allocation amount is smaller than the threshold, the child BS sends the UL BAR to only one parent BS. The child BS may use a certain threshold such that if the available RX buffer size is smaller than the threshold, the child BS sends the DL BAR to only one parent BS and zero is sent to other parent BSs (which may be assumed implicitly). The DL BAR may be sent based on a certain trigger, e.g., when the available Rx buffer size falls below a certain threshold.

Figure 21:
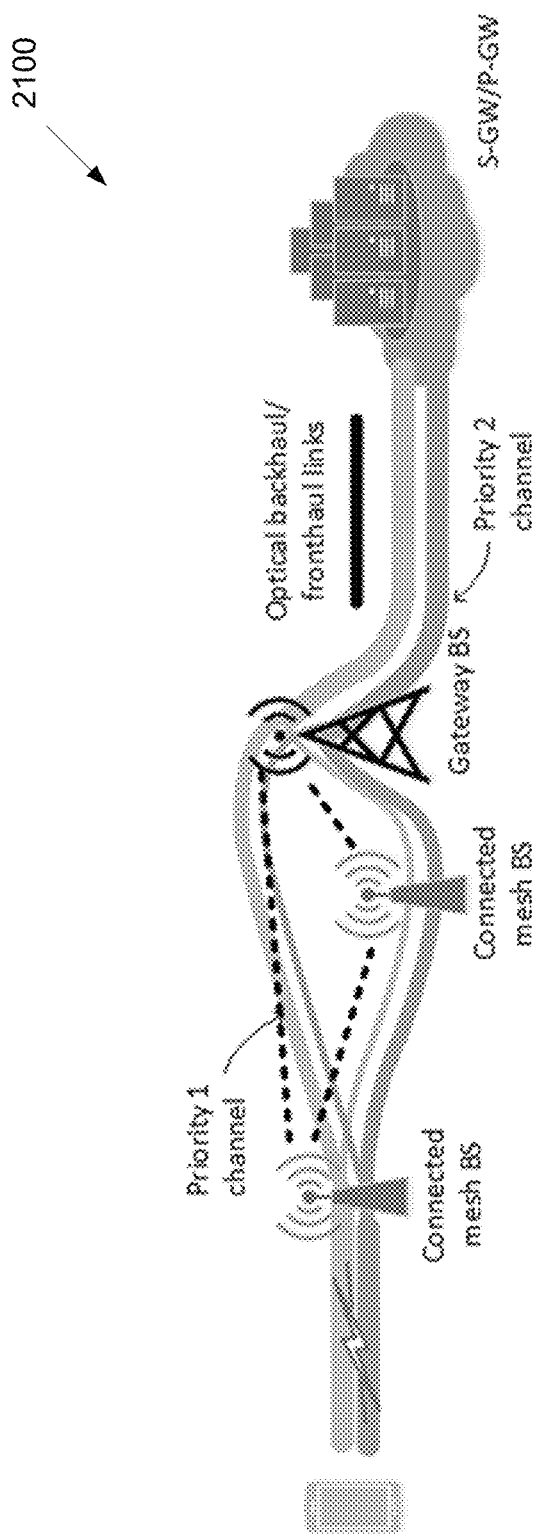
FIG. 21 illustrates an example logical channel prioritization enhancement according to embodiments of the present disclosure.

FIG. 21 illustrates an example of logical channel prioritization (LCP) enhancement in a network 2100 according to embodiments of the present disclosure. For example, the network 2100 may be implemented in the network 900 in FIG. 9. The embodiment of the LCP enhancement illustrated in FIG. 21 is for illustration only. FIG. 21 does not limit the scope of the present disclosure to any particular implementation.

In various embodiments, LCP is performed for mapping the buffered data to allocated resources according to the QoS level associated with each bearer, for the links between mesh BSs. This embodiment can be applied to any of the splitting options aforementioned. In one embodiment, each mesh BS stores a priority, prioritized bit rate (PBR), bucket size duration (BSD) for each logical channel. Similarly, at any BS a single buffer allocation variable $B_j$ can be saved for each logical channel j. The $B_j$'s may be initialized to zero, and incremented by PBR×TTI for each transmission time interval (TTI) in ascending order of channel priority. $B_j$'s can also be hard limited to be below a bucket size (for e.g., defined as PBR×BSD). In one embodiment, each mesh BS maps the buffered data for logical channel j up to the amount not exceeding $B_j$ in the order from highest priority to lowest priority.

For packet level traffic splitting, the LCP mechanism can be made to support the traffic splitting at the hub BS. In one embodiment the $B_j$'s are split among the different paths proportional to the BAR fractions (as aforementioned inter-BS BAR).

Figure 22:
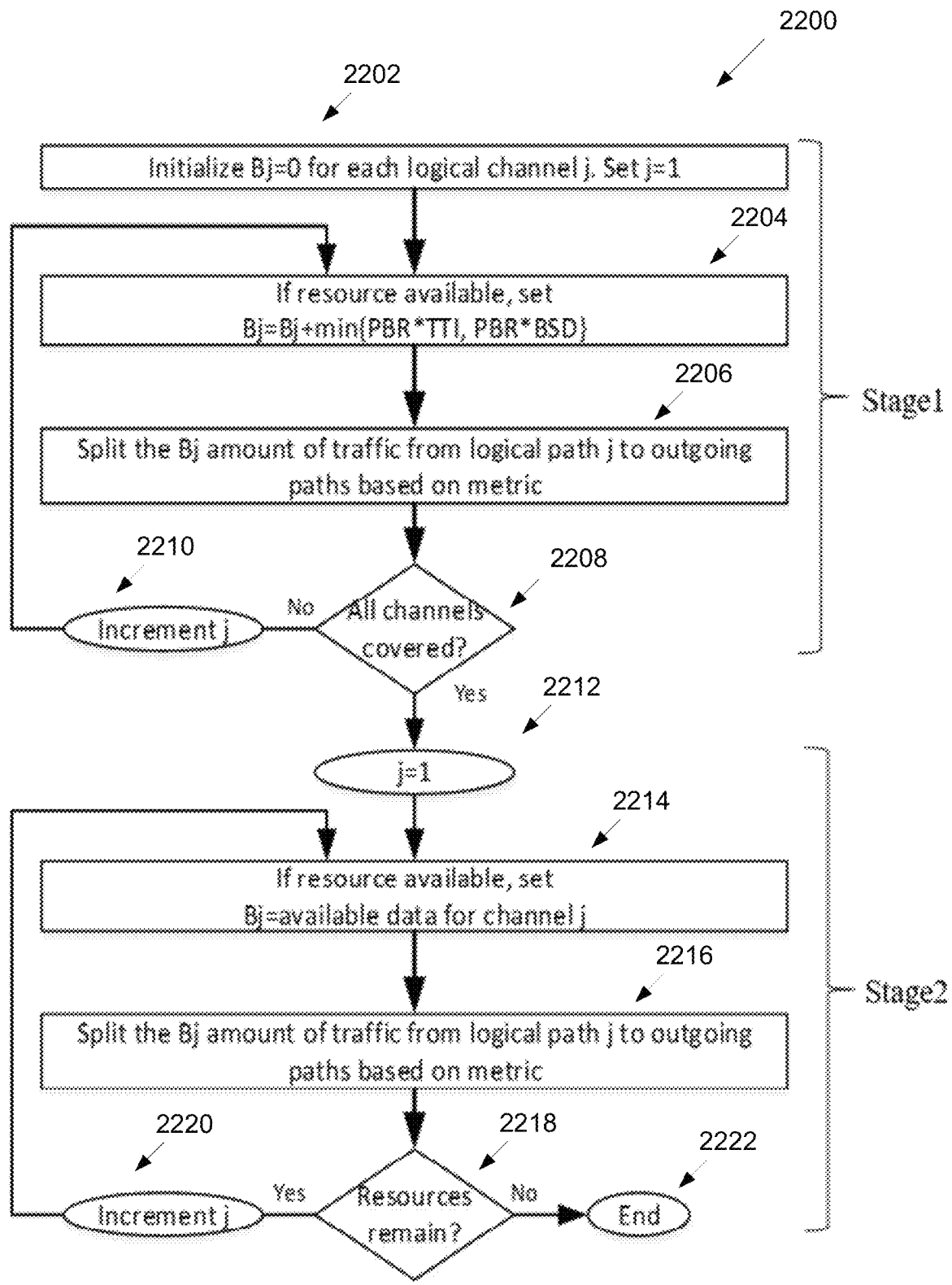
FIG. 22 illustrates a flowchart of a method for LCP mechanism to support traffic splitting according to embodiments of the present disclosure.

FIG. 22 illustrates a flowchart of a method 2200 for an LCP mechanism to support traffic splitting according to embodiments of the present disclosure. For example, the method 2200 may be performed by a network entity such as any one of those discussed above with regard to FIGS. 1 and/or 9. The embodiment of the method 2200 illustrated in FIG. 22 is for illustration only. FIG. 22 does not limit the scope of the present disclosure to any particular implementation.

As illustrated in FIG. 22, the method 2200 begins at step 2202. In step 2202, the method initializes Bj=0 for each logical channel j (e.g., set j=1). Subsequently, in step 2204, the method, if resource is available, sets Bj=Bj+min{PBR*TTI, PBR*BSD}. Subsequently, the method in step 2206 splits the Bj amount of traffic from logical path j to outgoing paths based on metric. Subsequently, in step 2208, the method determines whether all channel is covered. In step 2208, if all channel is not covered, the method 2200 increases j in step 2210 and perform step 2204. In step 2208, if all channel is covered, the method 2200 sets j=1 in step 2212. Subsequently, the method sets Bj=available data for channel j if resource is available. Subsequently, in step 2216, the method splits the Bj amount of traffic from logical path j to outgoing paths based on metric. In step 2218, the method determines resource remains. In step 2218, the resource remains, the method increases j in step 2220 and then perform step 2214. In step 2218, the resource does not remain, the method ends in step 2222.

In another embodiment, the $B_j$'s are split in proportion to the available remaining resources on each logical channel. If any transmit resources are left after the first round of allocation, then a second round can be initiated again based on the logical channel priority. However for second round no hard limit may be enforced i.e., lower priority channel may get round 2 resources after higher priority queue is empty. In one embodiment, the fraction of $B_j$ assigned to each path in round 2 is proportional to the available resources for that path in round 2. In another embodiment, the resources can be filled for each path using a path priority order, i.e., round 2 traffic is filled into a lower priority path after resources of all higher priority paths are exhausted. An example algorithm for this LCP mechanism is illustrated in FIG. 22.

Figure 23:
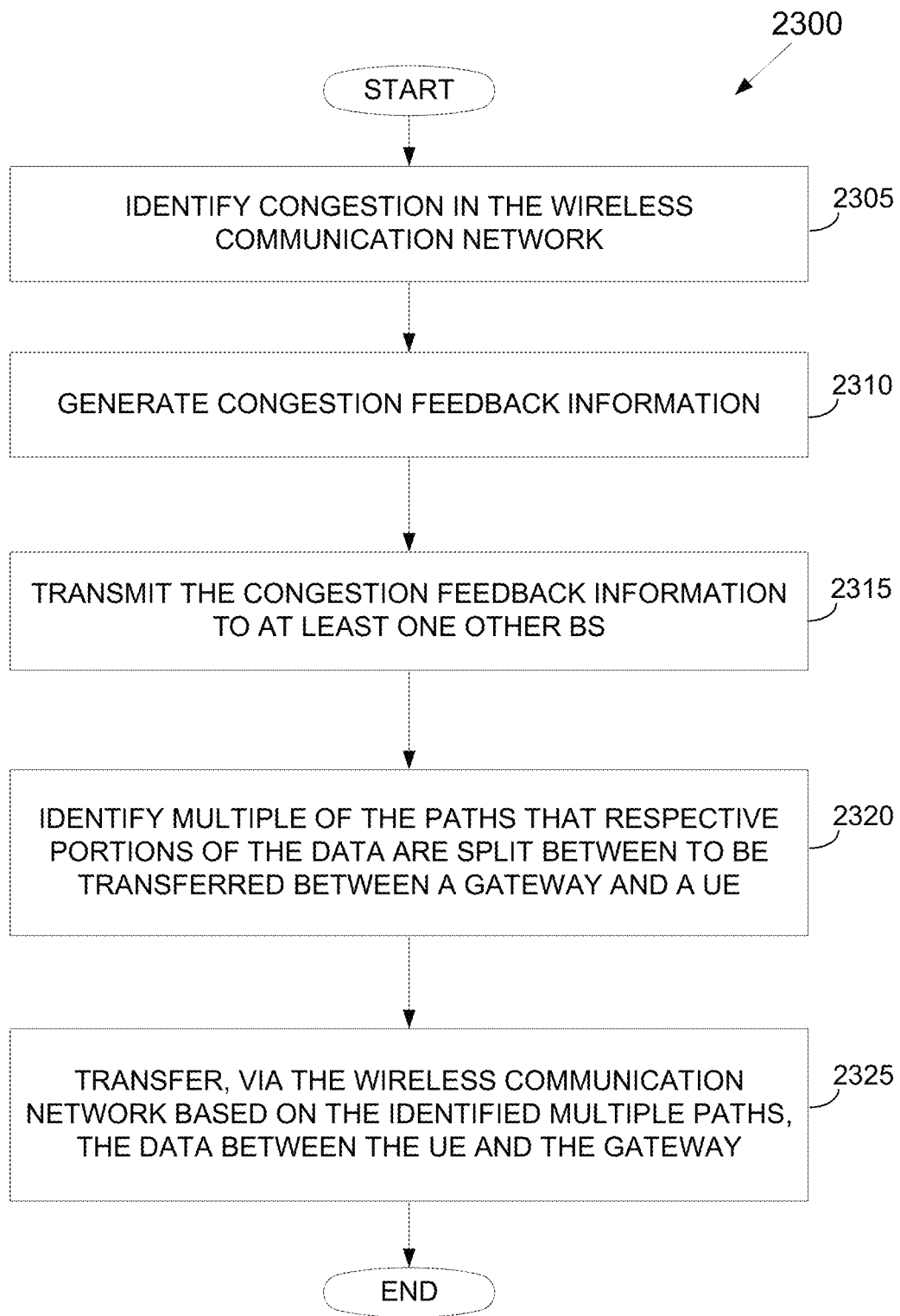
FIG. 23 illustrates a flowchart of a method for multi-path end-to-end connectivity according to embodiments of the present disclosure.

FIG. 23 illustrates an example of a method 2300 for multi-path end-to-end connectivity according to embodiments of the present disclosure. For example, the method 2300 may be performed by a base station such as any one of those discussed above with regard to FIGS. 1 and/or 9. The embodiment of the method 2300 illustrated in FIG. 23 is for illustration only. FIG. 23 does not limit the scope of the present disclosure to any particular implementation.

The method begins with the BS identifying congestion in the wireless communication network (step 2305). For example, in step 2305, the congestion may include any of network load, congestion, network delay information, a buffer status of the BS, and a packet sojourn time at the BS indicating congestion in the wireless communication network experienced or identified by the BS. The BS then generates congestion feedback information (step 2310). For example, in step 2310, the BS generates a message including the feedback, which may include congestion feedback information received or forwarded from other BSs in the network (e.g., as discussed above with regard to FIGS. 18-19B). The congestion feedback information can be generated periodically, aperiodically based on request from the at least one other BS, or dynamically based on a condition including at least one of buffer size and delay at the BS.

Thereafter, the BS transmits the congestion feedback information to at least one other BS (step 2315). For example, in step 2315, the BS may transmit the information to one or multiple BS that are directly connected to the BS (one hop) in the wireless communication network. In some embodiments, the congestion feedback information is exchanged between BSs in the wireless communication network that are directly connected to the BS (e.g., in UL and/or DL directions to one-hop nodes) and forwarded to other BSs that are located along one of the plurality of paths between the UE and the gateway but not directly connected to the BS (e.g., in UL and/or DL directions to two-plus hop nodes).

In various embodiments, the BS may identify an amount of UL bandwidth needed by the BS for the UL data transmission (e.g., based on TX buffer size) and transmit as the feedback information UL bandwidth allocation request(s) BS(s) that are parent node(s) (e.g., as discussed above with regard to FIG. 20A). For example, the BS may request UL resources from multiple BSs based on amount of resources needed and decide the BSs to transmit the requests to (e.g., based on prior availability) to receive the desired UL resources.

In various embodiments, the BS may identify an available RX buffer size of the BS for the DL data transmission and determine a number of DL bandwidth allocation requests to transmit based on the identified available RX buffer size (e.g., as discussed above with regard to FIG. 20B). For example, if the BS has a sufficient buffer size (e.g., above a threshold), the BS send a DL bandwidth allocation request indicating portions available RX buffer size of the BS to more than one of the BSs that are parent nodes to the BS such that the sum of the sent DL bandwidth allocation request does not exceed the available RX buffer size. The DL bandwidth allocation requests are used to determine an amount of DL data to send to the BS (e.g., by a network entity such as the parent BSs, a gateway BS or a core network controller).

The BS identifies multiple of the paths that respective portions of the data are split between to be transferred between a gateway and a UE (step 2320). For example in step 2320, the multiple paths are determined based at least in part on the congestion feedback information exchanged in the network and this determination of the multiple paths that the respective portions of the data are split between is made by the BS (e.g., in a decentralized approach) or decided by a network entity (e.g., a parent BSs, a gateway BS, or a core/central network controller) and is indicated to the BS by the gateway (e.g., in a centralized approach). The data can be split on a packet level or on a bearer level or both (e.g., as discussed above with regard to FIGS. 10-14C). In various embodiments, the congestion feedback information is further used to schedule resources on the multiple paths for example based on path availability and data priority. In various embodiments, LCP may be performed (e.g., by the BS, a parent BSs, a gateway BS, or a core/central network controller) for mapping the data to allocated resources according to a QoS level associated with the data such that the data is split between the multiple paths based on the LCP (e.g., as discussed above with regard to FIGS. 21 and 22). In various embodiments, the path planning is based on location and mobility information of the UE received and/or forwarded by the BS. For example, the UE may be assigned a path including a serving BS with a larger cell based on the location and mobility information of the UE (e.g., as discussed above with regard to FIGS. 16-17C).

The BS then transfers, via the wireless communication network based on the identified multiple paths, the data between the UE and the gateway (step 2325). For example in step 2325 and the method 2300, the transfer of data can be UL or DL; the BS can be the serving BS of the UE, a mesh BS in the network along the end-to-end path, or a gateway BS; the multiple paths can include one overall path from the UE to and from the gateway that includes parallel paths between nodes in the network. In various embodiments, the UL and DL paths may use different nodes. For example, the data is transmitted from the UE to the gateway via the multiple paths, which are UL paths, and additional data is transmitted from the gateway to the UE via a DL path that is different than the UL paths and vice versa (e.g., as discussed above with regard to FIG. 15).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station (BS) in a wireless communication network, the BS comprising:
a processor configured to:
identify congestion in the wireless communication network experienced by the BS, wherein the wireless communication network includes a plurality of BSs, of which the BS is one, that provide a plurality of paths for transfer of data between a gateway and a user equipment (UE); and
generate congestion feedback information indicating the congestion in the wireless communication network; and
a transceiver operably connected to the processor, the transceiver configured to transmit the congestion feedback information to at least one other BS in the wireless communication network,
wherein the processor is configured to identify a multiple of the paths that respective portions of the data are split between to be transferred between the gateway and the UE, wherein the multiple paths are determined based at least in part on the congestion feedback information, and wherein the determination of the multiple paths that the respective portions of the data are split between is made by the BS or indicated to the BS by the gateway,
wherein the transceiver is configured to transfer, via the wireless communication network based on the identified multiple paths, the data between the UE and the gateway, and
wherein at least one of:
(i) the data transfer is an uplink (UL) transmission, wherein:
the processor is further configured to:
identify an amount of UL bandwidth needed by the BS for transmission, via the wireless communication network, of the data from the UE to the gateway; and
generate, for the amount of UL bandwidth, multiple UL bandwidth allocation requests to multiple of the BSs, respectively, that are parent nodes to the BS; and
the transceiver is further configured to:
transmit the multiple UL bandwidth allocation requests to the multiple BSs, respectively; and
after allocation of the UL bandwidth, transmit the respective portions of the data to the multiple BSs, respectively, and
(ii) the data transfer is a downlink (DL) transmission, wherein:
the processor is configured to:
identify an available receive buffer size of the BS for transmission, via the wireless communication network, of the data from the gateway to the UE; and
determine a number of downlink (DL) bandwidth allocation requests to transmit based on the identified available receive buffer size, and
the transceiver is configured to transmit the number of DL bandwidth allocation requests to a number of the BSs, respectively, that are parent nodes to the BS, the number of DL bandwidth allocation requests indicating the available receive buffer size of the BS.

2. The BS of claim 1, wherein:
the DL bandwidth allocation requests are used to determine an amount of DL data to send to the BS, and to determine the number of DL bandwidth allocation requests to transmit, the processor is configured to determine whether to send a DL bandwidth allocation request to more than one of the BSs that are parent nodes to the BS based on comparison of the available receive buffer size of the BS to a threshold.

3. The BS of claim 1, wherein:
logical channel prioritization is performed for mapping the data to allocated resources according to a quality of service level associated with the data, and
the respective portions of the data are split between the multiple paths based on the logical channel prioritization.

4. The BS of claim 1, wherein:
the congestion feedback information generated by the processor includes at least one of a network load, network delay information, a buffer status of the BS, and a packet sojourn time at the BS, and
the congestion feedback information is generated and transmitted at least one of periodically, aperiodically based on request from the at least one other BS, and dynamically based on a condition including at least one of buffer size and delay at the BS.

5. The BS of claim 1, wherein:
the transceiver is configured to receive location and mobility information of the UE, and
wherein determination of the multiple paths for the respective portions of the data includes determination of a serving BS for the UE based on the location and mobility information of the UE.

6. The BS of claim 1, wherein:
the data, via the wireless communication network, is transmitted from the UE to the gateway via the multiple paths, which are uplink paths, and
additional data is transmitted from the gateway to the UE via a downlink path that is different than the uplink paths.

7. The BS of claim 1, wherein the congestion feedback information is exchanged between BSs in the wireless communication network that are directly connected to the BS and forwarded to other BSs that are located along one of the plurality of paths between the UE and the gateway but not directly connected to the BS.

8. The BS of claim 7, wherein the congestion feedback information is further used to schedule resources on the multiple paths.

9. A method for operating a base station (BS) in a wireless communication network, the method comprising:
identifying congestion in the wireless communication network experienced by the BS, wherein the wireless communication network includes a plurality of B Ss, of which the BS is one, that provide a plurality of paths for transfer of data between a gateway and a user equipment (UE);
generating congestion feedback information indicating the congestion in the wireless communication network;
transmitting the congestion feedback information to at least one other BS in the wireless communication network;
identifying a multiple of the paths that respective portions of the data are split between to be transferred between the gateway and the UE, wherein the multiple paths are determined based at least in part on the congestion feedback information, and wherein the determination of the multiple paths that the respective portions of the data are split between is made by the BS or indicated to the BS by the gateway; and
transferring, via the wireless communication network based on the identified multiple paths, the data between the UE and the gateway,
wherein at least one of:
(i) the data transfer is an uplink (UL) transmission, wherein the method further comprises:
identifying an amount of uplink (UL) bandwidth needed by the BS for transmission, via the wireless communication network, of the data from the UE to the gateway;
generating, for the amount of UL bandwidth, multiple UL bandwidth allocation requests to multiple of the B Ss, respectively, that are parent nodes to the BS; and
transmitting the multiple UL bandwidth allocation requests to the multiple BSs, respectively, wherein transferring the data comprises, after allocation of the UL bandwidth, transmitting the respective portions of the data to the multiple BSs, respectively, and
(ii) the data transfer is a downlink (DL) transmission, wherein the method further comprises:
identifying an available receive buffer size of the BS for transmission, via the wireless communication network, of the data from the gateway to the UE;
determining a number of downlink (DL) bandwidth allocation requests to transmit based on the identified available receive buffer size; and
transmitting the number of DL bandwidth allocation requests to a number of the BSs, respectively, that are parent nodes to the BS, the number of DL bandwidth allocation requests indicating the available receive buffer size of the BS.

10. The method of claim 9, wherein:
the DL bandwidth allocation requests are used to determine an amount of DL data to send to the BS, and
determining the number of DL bandwidth allocation requests to transmit comprises determining whether to send a DL bandwidth allocation request to more than one of the BSs that are parent nodes to the BS based on comparison of the available receive buffer size of the BS to a threshold.

11. The method of claim 9, further comprising:
performing logical channel prioritization for mapping the data to allocated resources according to a quality of service level associated with the data; and
splitting the respective portions of the data between the multiple paths based on the logical channel prioritization.

12. The method of claim 9, wherein:
the congestion feedback information generated includes at least one of a network load, network delay information, a buffer status of the BS, and a packet sojourn time at the BS, and
the congestion feedback information is generated and transmitted at least one of periodically, aperiodically based on request from the at least one other BS, and dynamically based on a condition including at least one of buffer size and delay at the BS.

13. The method of claim 9, further comprising:
receiving location and mobility information of the UE,
wherein determination of the multiple paths for the respective portions of the data includes determination of a serving BS for the UE based on the location and mobility information of the UE.

14. The method of claim 9, wherein:
the data, via the wireless communication network, is transmitted from the UE to the gateway via the multiple paths, which are uplink paths, and
additional data is transmitted from the gateway to the UE via a downlink path that is different than the uplink paths.

15. The method of claim 9, wherein the congestion feedback information is exchanged between BSs in the wireless communication network that are directly connected to the BS and forwarded to other BSs that are located along one of the plurality of paths between the UE and the gateway but not directly connected to the BS.

16. The method of claim 15, wherein the congestion feedback information is further used to schedule resources on the multiple paths.

* * * * *